United States Patent
Han et al.

(10) Patent No.: US 9,258,812 B2
(45) Date of Patent: Feb. 9, 2016

(54) METHOD AND APPARATUS FOR TRANSMITTING CONTROL INFORMATION IN A WIRELESS COMMUNICATION SYSTEM

(75) Inventors: Seunghee Han, Anyang-si (KR); Hyunsoo Ko, Anyang-si (KR); Jaehoon Chung, Anyang-si (KR); Moonil Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 559 days.

(21) Appl. No.: 13/990,634

(22) PCT Filed: Apr. 22, 2011

(86) PCT No.: PCT/KR2011/002938
§ 371 (c)(1),
(2), (4) Date: Dec. 20, 2013

(87) PCT Pub. No.: WO2011/139037
PCT Pub. Date: Nov. 10, 2011

(65) Prior Publication Data
US 2014/0092832 A1    Apr. 3, 2014

Related U.S. Application Data

(60) Provisional application No. 61/332,167, filed on May 6, 2010.

(30) Foreign Application Priority Data

Jan. 12, 2011 (KR) .................. 10-2011-0003086

(51) Int. Cl.
*H04W 4/00* (2009.01)
*H04B 7/216* (2006.01)
*H04W 72/04* (2009.01)
*H04L 1/18* (2006.01)
*H04L 5/00* (2006.01)
*H04L 1/16* (2006.01)
*H04L 1/00* (2006.01)
*H04L 27/26* (2006.01)

(52) U.S. Cl.
CPC ........... *H04W 72/042* (2013.01); *H04L 1/0073* (2013.01); *H04L 1/1671* (2013.01); *H04L 1/1861* (2013.01); *H04L 5/001* (2013.01); *H04L 5/0016* (2013.01); *H04L 5/0055* (2013.01); *H04L 27/2633* (2013.01); *H04L 27/2636* (2013.01)

(58) Field of Classification Search
USPC .................................................. 370/329, 342
See application file for complete search history.

(56) References Cited

U.S. PATENT DOCUMENTS

2008/0273513 A1* 11/2008 Montojo et al. ............... 370/342
2010/0232373 A1*  9/2010 Nory et al. .................... 370/329

FOREIGN PATENT DOCUMENTS

| WO | WO 2009-099303 A2 | 8/2009 |
| WO | WO 2010-018978 A2 | 2/2010 |
| WO | WO 2010-044564 A2 | 4/2010 |

*Primary Examiner* — Kiet Tang
(74) *Attorney, Agent, or Firm* — Dentons US LLP

(57) ABSTRACT

The present invention relates to a wireless communication system, and more specifically, to an ACK/NACK (Acknowledgement/Negative ACK) transmission method in a wireless communication system and an apparatus therefor. The ACK/NACK transmission method preformed by user equipment in a wireless communication system comprises: receiving a PDCCH (Physical Downlink Control Channel); receiving a PDSCH (Physical Downlink Shared Channel) indicated by the PDCCH; and transmitting an ACK/NACK for the PDSCH. According to the ACK/NACK transmission method and apparatus of the invention.

8 Claims, 36 Drawing Sheets

FIG. 5
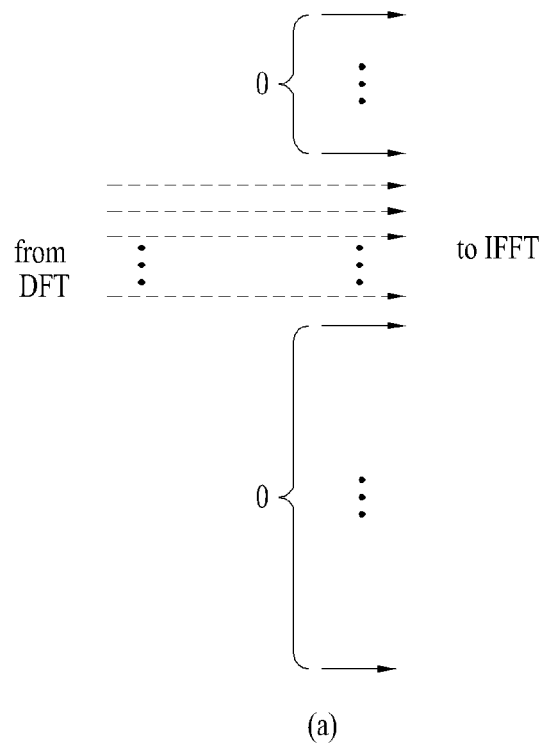
(a)
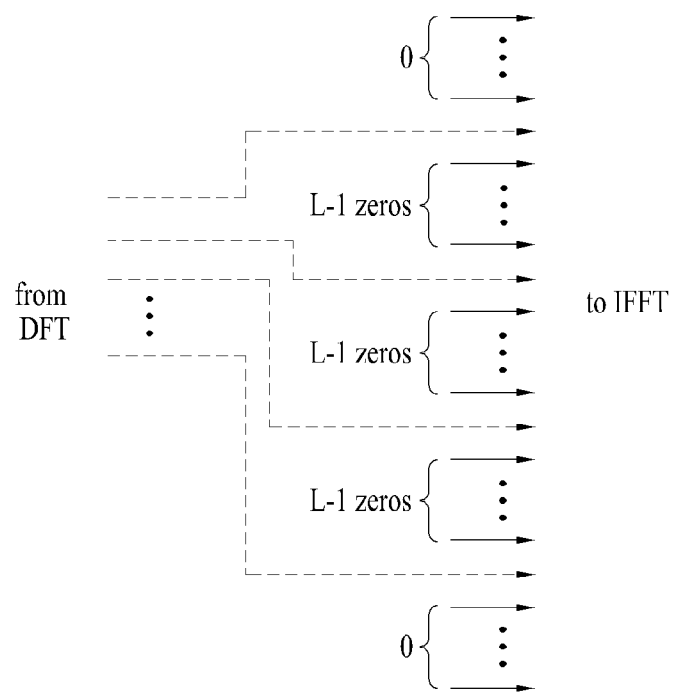
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | n' = 0 | | 12 | n' = 0 | | 12 |
| 2 | 1 | | 6 | | | 6 | |
| 3 | 2 | 1 | | 13 | 1 | | 13 |
| 4 | 3 | | 7 | | | 7 | |
| 5 | 4 | 2 | | 14 | 2 | | 14 |
| 6 | 5 | | 8 | | | 8 | |
| 7 | 6 | 3 | | 15 | 3 | | 15 |
| 8 | 7 | | 9 | | | 9 | |
| 9 | 8 | 4 | | 16 | 4 | | 16 |
| 10 | 9 | | 10 | | | 10 | |
| 11 | 10 | 5 | | 17 | 5 | | 17 |
| 0 | 11 | | 11 | | | 11 | |

$\Delta_{shift}^{PUCCH} \in \begin{cases} \{1,2,3\} \text{ for normal cyclic prefix} \\ \{1,2,3\} \text{ for extended cyclic prefix} \end{cases}$ Cell-specific Cyclic shift value of CAZAC sequence $\delta_{offset}^{PUCCH} \in \{0,1,...,\Delta_{shift}^{PUCCH} - 1\}$ Cell specific cyclic shift offset

- $n_{OC}$   Orthogonal sequence index for ACK/NACK
- $\bar{n}_{OC}$   Orthogonal sequence index for RS
- $n_{CS}$   Cyclic shift value of a CAZAC sequence
- n'   ACK/NACK resource index used for the channelization in a RB M=1, N=1 (No CIF based scheduling; non-cross carrier scheduling)

(CIF based scheduling; cross carrier scheduling)

M=2, N=1 (UE successfully detects a PDCCH from a DL PCC although a single PDCCH is lost)

M=1, N=1 (No CIF based scheduling; non-cross carrier scheduling)

M=1, N=1 (CIF based scheduling; cross carrier scheduling)

M=2, N=1 (UE successfully detects a PDCCH from a DL SCC although a single PDCCH is lost)

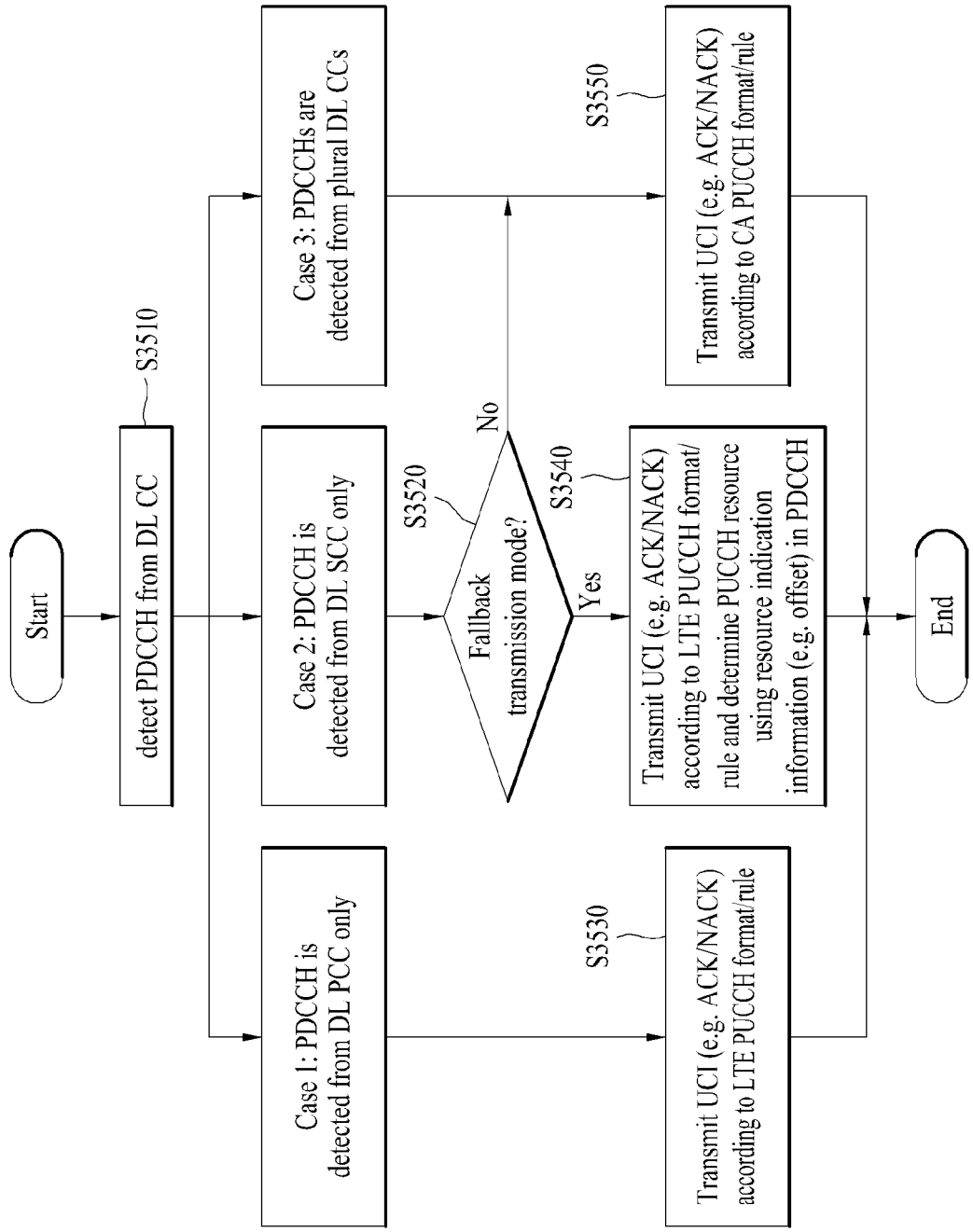

METHOD AND APPARATUS FOR TRANSMITTING CONTROL INFORMATION IN A WIRELESS COMMUNICATION SYSTEM

This application is a 35 USC §371 National Stage entry of International Application No. PCT/KR2011/002938 filed on Apr. 22, 2011, and claims priority to U.S. Provisional Application No. 61/332,167, filed on May 6, 2010, and Korean Application No. 10-2011-0003086, filed on Jan. 12, 2011, all of which are incorporated by reference in their entirety herein.

TECHNICAL FIELD

The present invention relates to a wireless communication system, and more specifically, to a method and apparatus for transmitting control information. The wireless communication system can support carrier aggregation (CA).

BACKGROUND ART

Extensive research has been conducted to provide various types of communication services including voice and data services in wireless communication systems. In general, a wireless communication system is a multiple access system that supports communication with multiple users by sharing available system resources (e.g. bandwidth, transmission power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

DISCLOSURE

Technical Problem

An object of the present invention is to provide a method and apparatus for efficiently transmitting control information in a wireless communication system. Another object of the present invention is to provide a channel format, signal processing method and apparatus for efficiently transmitting control information. Another object of the present invention is to provide a method and apparatus for efficiently allocating resources for transmitting control information.

The technical problems solved by the present invention are not limited to the above technical problems and those skilled in the art may understand other technical problems from the following description.

Technical Solution

The object of the present invention can be achieved by providing a method for transmitting an ACK/NACK (Acknowledgement/Negative ACK) by user equipment (UE) in a wireless communication system, including: receiving a PDCCH (Physical Downlink Control Channel); receiving a PDSCH (Physical Downlink Shared Channel) indicated by the PDCCH; and transmitting an ACK/NACK for the PDSCH, wherein a resource for ACK/NACK transmission is inferred using the sum of the index of a resource forming the PDCCH and an offset value.

In another aspect of the present invention, provided herein is a UE configured to transmit an ACK/NACK in a wireless communication system, including: a radio frequency (RF) unit; and a processor, wherein the processor is configured to receive a PDCCH, to receive a PDSCH indicated by the PDCCH and to transmit an ACK/NACK for the PDSCH, wherein a resource for ACK/NACK transmission is inferred using the sum of the index of a resource forming the PDCCH and an offset value.

The PDCCH may include one or more control channel elements (CCEs) and the resource for ACK/NACK transmission may be inferred using the smallest index of indices of CCEs forming the PDCCH.

The offset value may be received through the PDCCH.

The offset value may be received through a transmit power control (TPC) field or a downlink assignment index (DAI) field in the PDCCH.

The offset value may be received through some bits or some states of the TPC field of DAI field.

The offset value may be included only in a PDCCH received through a secondary component carrier (SCC).

The resource for ACK/NACK transmission may be a PUCCH (Physical Uplink Control Channel) resource.

Advantageous Effects

According to the present invention, control information can be efficiently transmitted in a wireless communication. Furthermore, a channel format, signal processing method and apparatus for efficiently transmitting control information can be provided. In addition, resources for transmitting control information can be efficiently allocated.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a signal mapping scheme in a frequency domain, which satisfies single carrier property;

FIG. 17 illustrates ACK/NACK channelization for PUCCH formats 1a and 1b;

FIGS. 35 and 36 illustrate a resource collision solution during UCI transmission according to an embodiment of the present invention;

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA can be implemented as a wireless technology such as Universal Terrestrial Radio Access (UTRA) or CDMA2000. TDMA can be implemented as a wireless technology such as Global System for Mobile communications (GSM)/General Packet Radio Service (GPRS)/Enhanced Data Rates for GSM Evolution (EDGE). OFDMA can be implemented as a wireless technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA. LTE-Advanced (LTE-A) is an evolution of 3GPP LTE. While the following description is given, centering on 3GPP LTE/LTE-A for clarity of description, this is purely exemplary and thus should not be construed as limiting the present invention.

In a wireless communication system, a UE receives information from a BS through downlink and transmits information to the BS through uplink. Information transmitted and received between the BS and the UE includes data and various types of control information. Various physical channels are present according to type/usage of information transmitted and received between the BS and the UE.

Figure 1:
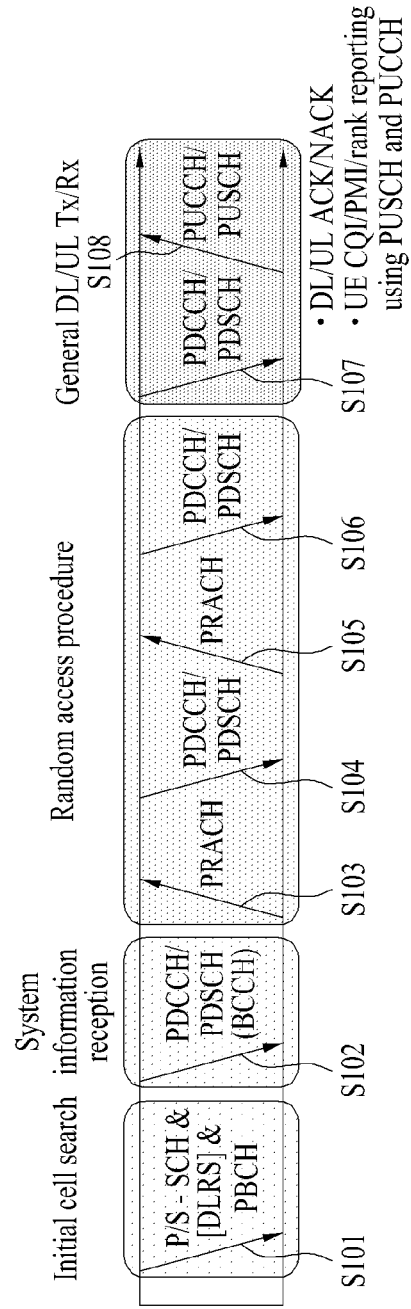
FIG. 1 illustrates physical channels used in a 3GPP LTE system and a signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE may be synchronized with the BS and acquire information such as a cell Identifier (ID) by receiving a Primary Synchronization Channel (P-SCH) and a Secondary Synchronization Channel (S-SCH) from the BS. Then the UE may receive broadcast information from the cell on a Physical Broadcast Channel (PBCH). In the mean time, the UE may determine a downlink channel status by receiving a Downlink Reference Signal (DL RS) during initial cell search.

After initial cell search, the UE may acquire more specific system information by receiving a Physical Downlink Control Channel (PDCCH) and receiving a Physical Downlink Shared Channel (PDSCH) based on information of the PDCCH in step S102.

The UE may perform a random access procedure to access the BS in steps S103 to S106. For random access, the UE may transmit a preamble to the BS on a Physical Random Access Channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a Physical Uplink Shared Channel (PUSCH)/Physical Uplink Control Channel (PUCCH) (S108), as a general downlink/uplink signal transmission procedure. Here, control information transmitted from the UE to the BS is called uplink control information (UCI). The UCI may include a Hybrid Automatic Repeat and request Acknowledgement/Negative-ACK (HARQ ACK/NACK) signal, scheduling request (SR), a Channel Quality Indicator (CQI), a Precoding Matrix Index (PMI), a Rank Indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
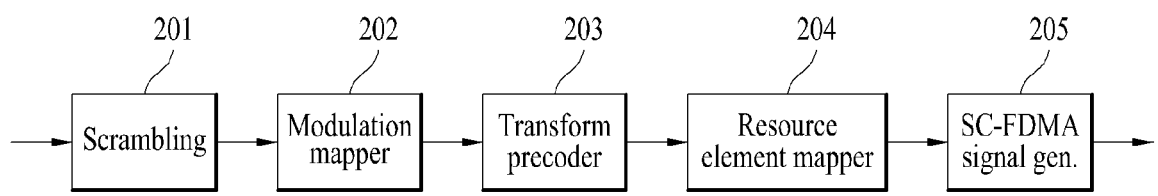
FIG. 2 illustrates an uplink signal processing procedure.

FIG. 2 illustrates a signal processing procedure through which a UE transmits an uplink signal.

To transmit the uplink signal, a scrambling module 210 of the UE may scramble the uplink signal using a UE-specific scramble signal. The scrambled signal is input to a modulation mapper 220 in which the scrambled signal is modulated into complex symbols using Binary Phase Shift Keying (BPSK), Quadrature Phase Shift Keying (QPSK) or 16-Quadrature amplitude Modulation (QAM)/64-QAM according to signal type and/or channel status. The modulated complex symbols are processed by a transform pre-coder 230, and then applied to a resource element mapper 240. The resource element mapper 240 may map the complex symbols to time-frequency resource elements. The signal processed in this manner may be subjected to an SC-FDMA signal generator 250 and transmitted to a BS through an antenna.

Figure 3:
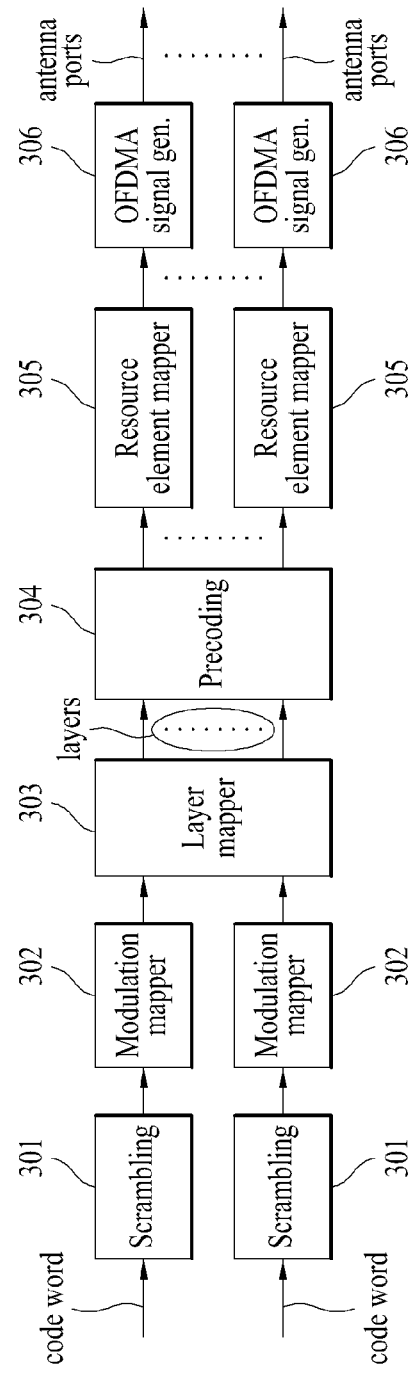
FIG. 3 illustrates a downlink signal processing procedure.

FIG. 3 illustrates a signal processing procedure through which the BS transmits a downlink signal.

In a 3GPP LTE system, the BS may transmit one or more codewords on downlink. The codewords may be processed into complex symbols through a scrambling module 301 and a modulation mapper 302 as in the uplink shown in FIG. 2. Then, the complex symbols are mapped to a plurality of layers by a layer mapper 303. The layers may be multiplied by a pre-coding matrix in a pre-coding module 304 and allocated to transport antennas. The processed signals for the respective antennas may be mapped to time-frequency resource elements by a resource element mapper 305 and subjected to an OFDM signal generator 306 to be transmitted through the antennas.

When the UE transmits an uplink signal in a wireless communication system, a peak-to-average ratio (PAPR) becomes a problem, as compared to a case in which the BS transmits a downlink signal. Accordingly, uplink signal transmission uses SC-FDMA while downlink signal transmission uses OFDMA, as described above with reference to FIGS. 2 and 3.

Figure 4:
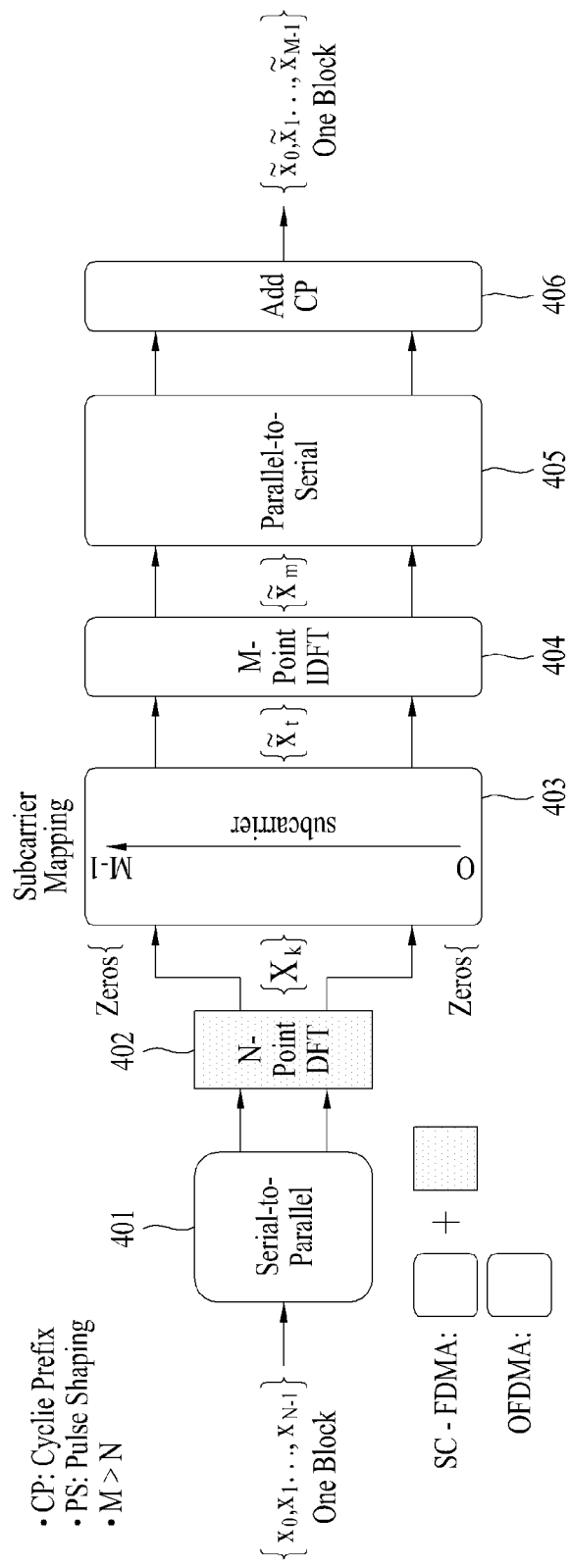
FIG. 4 illustrates SC-FDMA and OFDMA schemes.

FIG. 4 illustrates SC-FDMA and OFDMA schemes. The 3GPP system employs OFDMA in downlink and uses SC-FDMA in uplink.

Referring to FIG. 4, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402.

FIG. 5 illustrates a signal mapping scheme in a frequency domain, which satisfies single carrier property. FIG. 5(a) illustrates a localized mapping scheme and FIG. 5(b) illustrates a distributed mapping scheme.

Clustered SC-FDMA, which is a modified version of SC-FDMA, will now be described. Clustered SC-FDMA divides DFT process output samples into sub-groups in a subcarrier mapping process and discretely maps the sub-groups to the frequency domain (or subcarrier domain).

Figure 6:
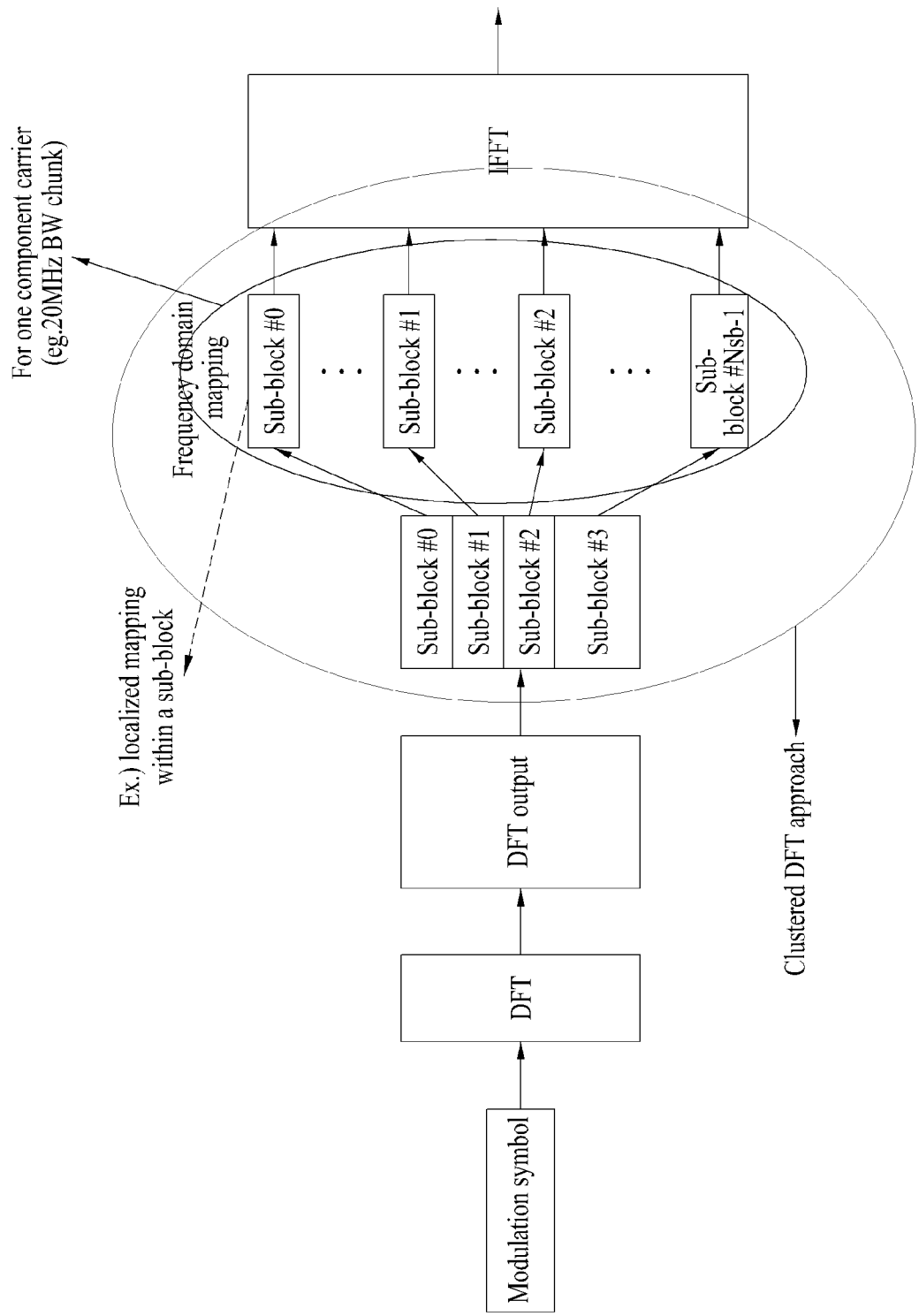
FIG. 6 illustrates a signal processing procedure of mapping DFT process output samples to a single carrier in clustered SC-FDMA.
Figure 7:
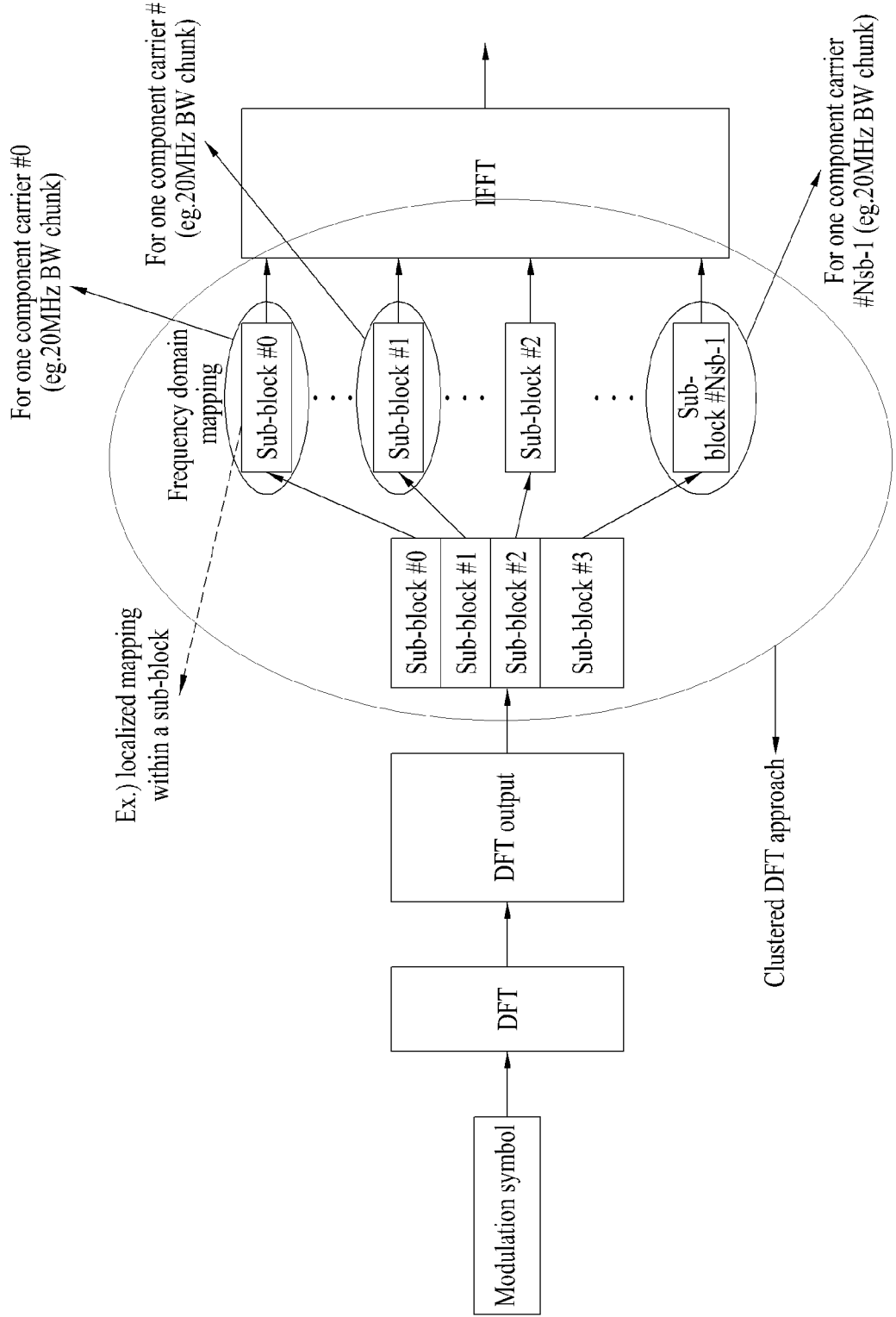
FIGS. 7 and 8 illustrate a signal processing procedure of mapping DFT process output samples to multiple carriers in clustered SC-FDMA.
Figure 8:
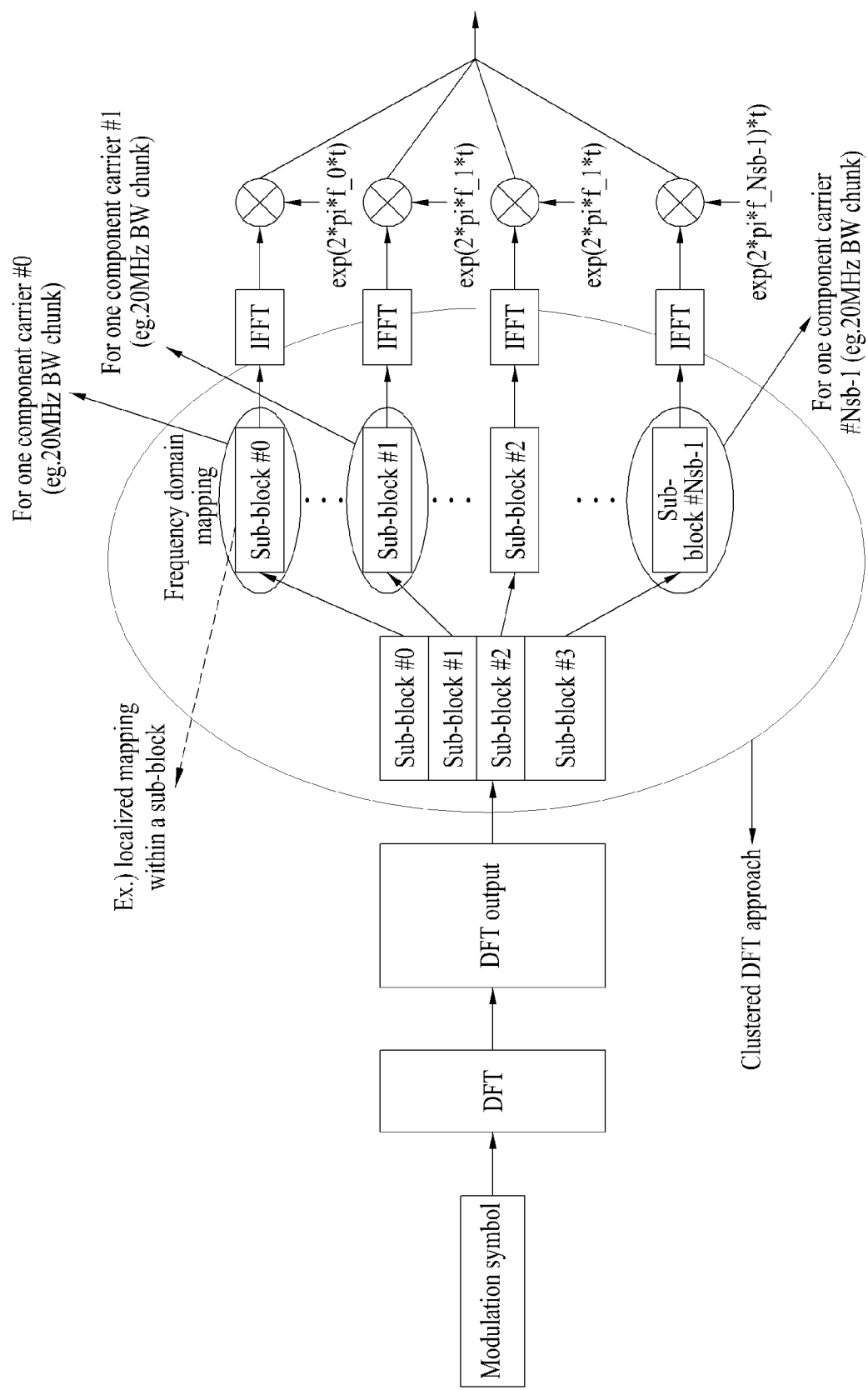

FIG. 6 illustrates a signal processing procedure for mapping DFT process output samples to a single carrier in clustered SC-FDMA. FIGS. 7 and 8 illustrate a signal processing procedure for mapping DFT process output samples to multiple carriers in clustered SC-FDMA. FIG. 6 shows an example of application of intra-carrier clustered SC-FDMA while FIGS. 7 and 8 show examples of application of inter-carrier clustered SC-FDMA. FIG. 7 illustrates a case in which a signal is generated through a single IFFT block when subcarrier spacing between neighboring component carriers is set while component carriers are contiguously allocated in the frequency domain. FIG. 8 shows a case in which a signal is generated through a plurality of IFFT blocks when component carriers are non-contiguously allocated in the frequency domain.

Figure 9:
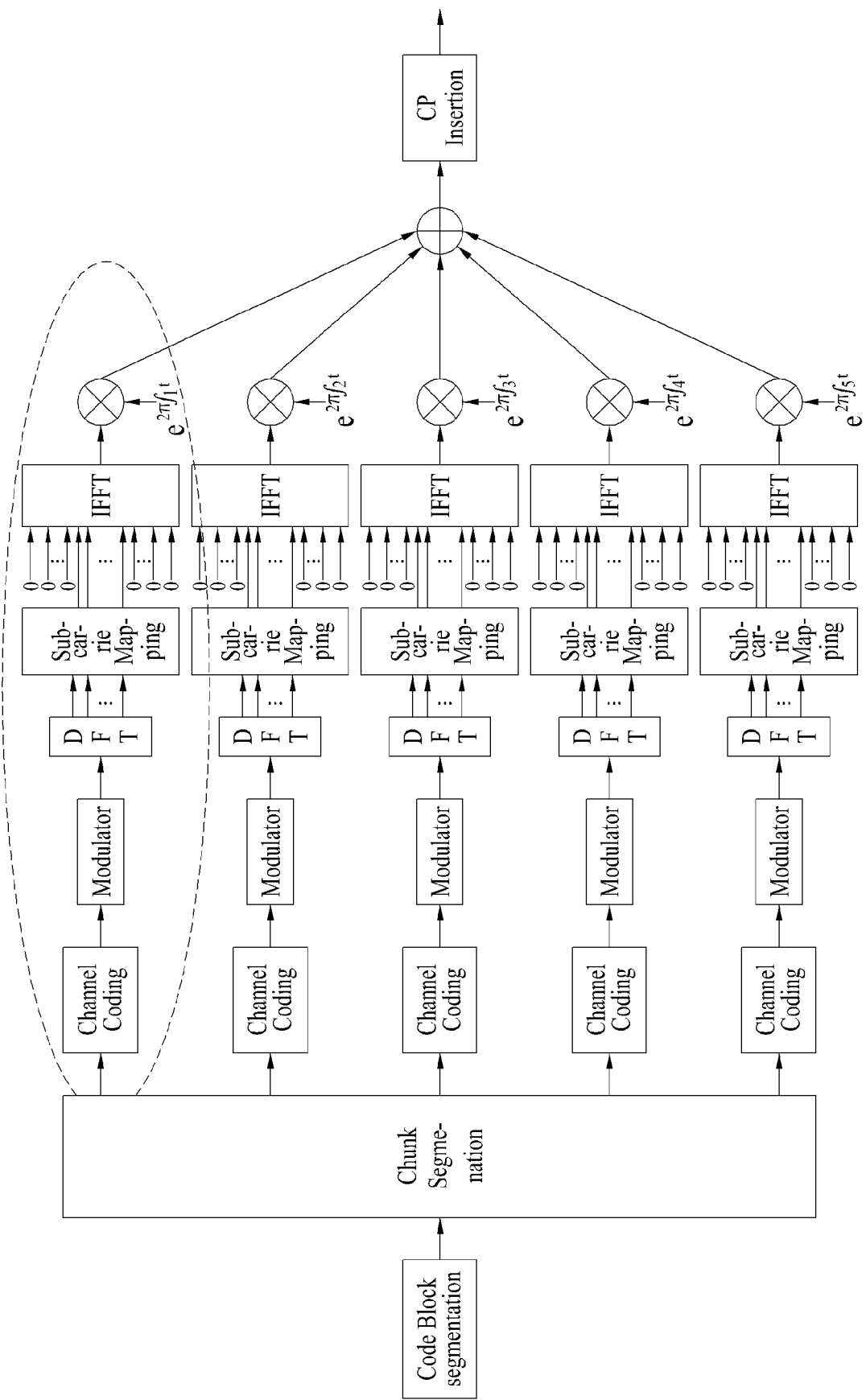
FIG. 9 illustrates a signal processing procedure in segmented SC-FDMA.

FIG. 9 illustrates a signal processing procedure in segmented SC-FDMA.

Segmented SC-FDMA is a simple extension of the DFT spreading and IFFT subcarrier mapping structure of the conventional SC-FDMA, when the number of DFT blocks is equal to the number of IFFT blocks and thus the DFT blocks and the IFFT blocks are in one-to-one correspondence. While the term 'segmented SC-FDMA' is adopted herein, it may also be called N×SC-FDMA or N×DFT spread OFDMA (N×DFT-s-OFDMA). Referring to FIG. 9, the segmented SC-FDMA is characterized in that total time-domain modulation symbols are divided into N groups (N is an integer larger than 1) and a DFT process is performed on a group-by-group basis to relieve the single carrier property constraint.

Figure 10:
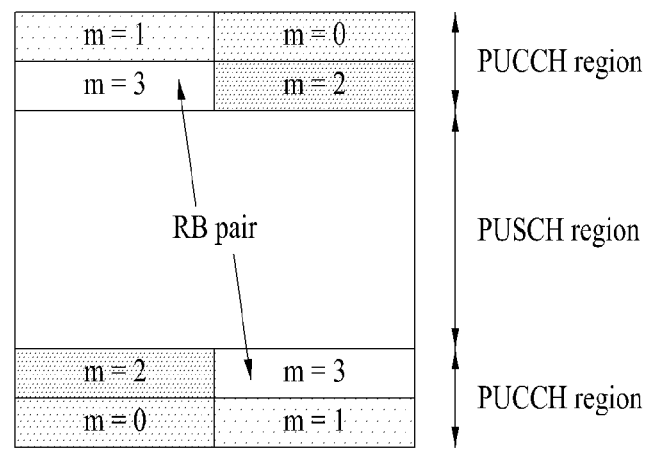
FIG. 10 illustrates an uplink subframe structure.

FIG. 10 illustrates an uplink subframe structure.

Referring to FIG. 10, an uplink subframe includes a plurality of slots (e.g. two slots). The slots may include different numbers of SC-FDMA symbols according to CP length. For example, the slot can include 7 SC-FDMA symbols in case of normal CP. The uplink subframe is divided into a data region and a control region. The data region includes a PUSCH and is used to transmit a data signal such as audio data. The control region includes a PUCCH and is used to transmit UCI. The PUCCH includes RB pairs (e.g. 7 RB pairs in frequency mirrored positions, and m=0, 1, 2, 3, 4) located on both ends of the data region in the frequency domain and is hopped based on slots. The UCI includes HARQ ACK/NACK, CQI, PMI, RI, etc.

Figure 11:
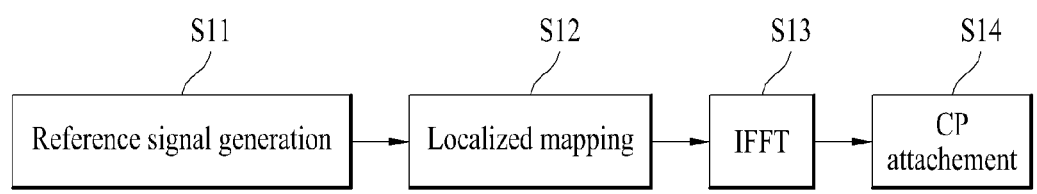
FIG. 11 illustrates a signal processing procedure for transmitting a reference signal (RS) on uplink.

FIG. 11 illustrates a signal processing procedure for transmitting a reference signal (RS) on uplink. While data is converted into a frequency domain signal through a DFT precoder, frequency-mapped, and then transmitted through IFFT, an RS does not passes the DFT precoder. Specifically, an RS sequence generated in the frequency domain (S11) is sequentially subjected to localization mapping (S12), IFFT (S13) and CP addition (S14) to be transmitted.

RS sequence $r_{u,v}^{(\alpha)}(n)$ is defined by cyclic shift $\alpha$ of a base sequence and may be represented by Expression 1.

$$r_{u,v}^{(\alpha)}(n) = e^{j\alpha n} \bar{r}_{u,v}(n), 0 \le n < M_{sc}^{RS} \quad \text{[Expression 1]}$$

Here, $M_{sc}^{RS} = mN_{sc}^{RB}$ denotes the length of the RS sequence, $N_{sc}^{RB}$ denotes a resource block size on a subcarrier basis, $1 \le m \le N_{RB}^{max,UL}$, and $N_{RB}^{max,UL}$ represents a maximum uplink transmission bandwidth.

Base sequence $\bar{r}_{u,v}(n)$ is divided into several groups. $u \in \{0, 1, \ldots, 29\}$ denotes a group number and v corresponds to a base sequence number in a corresponding group. Each group includes one base sequence (v=0) having a length of $M_{sc}^{RB} = mN_{sc}^{RB}$ ($1 \le m \le 5$) and two base sequences (v=0,1) having a length of $M_{sc}^{RB} = mN_{sc}^{RB}$ ($6 \le m \le N_{RB}^{max,UL}$). The sequence group number u and base sequence number v in the corresponding group may vary with time. Base sequence $\bar{r}_{u,v}(0), \ldots, \bar{r}_{u,v}(M_{sc}^{RS}-1)$ is defined according to sequence length $M_{sc}^{RS}$.

A base sequence having a length of longer than $3N_{sc}^{RB}$ can be defined as follows.

For $M_{sc}^{RS} \ge 3N_{sc}^{RB}$, base sequence $\bar{r}_{u,v}(0), \ldots, \bar{r}_{u,v}(M_{sc}^{RS}-1)$ is given by the following expression 2.

$$\bar{r}_{u,v}(n) = x_q(n \bmod N_{ZC}^{RS}), 0 \le n < M_{sc}^{RS} \quad \text{[Expression 2]}$$

Here, the q-th root Zadoff-Chu sequence can be defined by the following expression 3.

$$x_q(m) = e^{-j\frac{\pi q m(m+1)}{N_{ZC}^{RS}}}, 0 \le m \le N_{ZC}^{RS} - 1 \quad \text{[Expression 3]}$$

Here, q satisfies the following expression 4.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \quad \text{[Expression 4]}$$

The length $N_{ZC}^{RS}$ of the Zadoff-Chue sequence is given by the largest prime number, and thus $N_{ZC}^{RS} < M_{sc}^{RS}$ is satisfied.

A base sequence having a length of less than $3N_{sc}^{RB}$ can be defined as follows. The base sequence is given by the following expression 5 for $M_{sc}^{RS}=N_{sc}^{RB}$ and $M_{sc}^{RS}=2N_{sc}^{RB}$.

$$\bar{r}_{u,v}(n)=e^{j\phi(n)\pi/4}, 0\leq n\leq M_{sc}^{RS}-1 \quad \text{[Expression 5]}$$

Here, for $M_{sc}^{RS}=N_{sc}^{RB}$ and $M_{sc}^{RS}=2N_{sc}^{RB}$, $\phi(n)$ is given as shown in Tables 1 and 2, respectively.

TABLE 1

| u | $\phi(0),\ldots,\phi(11)$ | | | | | | | | | | |
|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

RS hopping will now be described.

Sequence group number u in slot $n_s$ can be defined by group hopping pattern $f_{gh}(n_s)$ and sequence shift pattern $f_{ss}$ as represented by Expression 6.

$$u=(f_{gh}(n_s)+f_{ss})\bmod 30 \quad \text{[Expression 6]}$$

Here, mod denotes a modulo operation.

There are 17 different hopping patterns and 30 different sequence shift patterns. Sequence group hopping may be enabled or disabled according to a parameter that enables group hopping provided by a higher layer.

A PUCCH and a PUSCH may have different sequence shift patterns while having the same hopping pattern.

The PUCCH and PUSCH have the same group hopping pattern $f_{gh}(n_s)$ that is given by the following expression 7.

$$f_{gh}(n_s) = \begin{cases} 0 & \text{if group hopping is disabled} \\ \left(\sum_{i=0}^{7} c(8n_s+i)\cdot 2^i\right)\bmod 30 & \text{if group hopping is enabled} \end{cases} \quad \text{[Expression 7]}$$

Here, c(i) corresponds to a pseudo-random sequence and a pseudo-random sequence generator may be initialized to $$c_{init} = \left\lfloor \frac{N_{ID}^{cell}}{30} \right\rfloor$$

at the beginning of each radio frame.

Sequence shift pattern $f_{ss}$ is differently defined for the PUCCH and PUSCH.

For the PUCCH, sequence shift pattern $f_{ss}^{PUCCH}$ is given as $f_{ss}^{PUCCH}=N_{ID}^{cell}\bmod 30$. For the PUSCH, sequence shift

TABLE 2

| u | $\phi(0),\ldots,\phi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 | pattern $f_{ss}^{PUCCH}$ is given as $f_{ss}^{PUCCH}=(f_{ss}^{PUCCH}+\Delta_{ss})\bmod 30$. $\Delta_{ss}\in\{0, 1, \ldots, 29\}$ is generated by a higher layer.

Sequence hopping will now be described.

Sequence hopping is applied only to a reference signal having a length satisfying $M_{sc}^{RS} \geq 6N_{sc}^{RB}$.

For a reference signal having a length satisfying $M_{sc}^{RS} < 6N_{sc}^{RB}$, base sequence number v is given as in a base sequence group.

For a reference signal having a length satisfying $M_{sc}^{RS} \geq 6N_{sc}^{RB}$, base sequence number v is given by the following expression 8 in the base sequence group in slot $n_s$.

$$v = \begin{cases} c(n_s) & \text{if group hopping is disabled and sequence hopping is enabled} \\ 0 & \text{otherwise} \end{cases} \quad \text{[Expression 8]}$$

Here, c(i) corresponds to the pseudo-random sequence and a parameter that is provided by a higher layer and enables sequence hopping determines whether sequence hopping is enabled or disabled. The pseudo-random sequence generator may be initialized to $$c_{init} = \left\lfloor \frac{N_{ID}^{cell}}{30} \right\rfloor \cdot 2^5 + f_{ss}^{PUSCH}$$

at the beginning of a radio frame.

A reference signal for the PUSCH is determined as follows.

Reference signal sequence $r^{PUSCH}(\cdot)$ for the PUSCH is defined as $r^{PUSCH}(m \cdot M_{sc}^{RS}+n)=r_{u,v}^{(\alpha)}(n)$ where m and n satisfy $$m = 0, 1$$

$$n = 0, \ldots, M_{sc}^{RS} - 1$$

and $M_{sc}^{RS}=M_{sc}^{PUSCH}$.

A cyclic shift is given as $\alpha=2\cdot n_{cs}/12$ with $n_{cs}=(n_{DMRS}^{(1)}+n_{DMRS}^{(2)}+n_{PRS}(n_s))\bmod 12$ in one slot.

Here, $n_{DMRS}^{(1)}$ is a broadcast value, $n_{DMRS}^{(2)}$ is given according to uplink scheduling allocation, and $n_{PRS}(n_s)$ is a cell-specific cyclic shift value. $n_{PRS}(n_s)$ varies with slot number $n_s$ and is given as $n_{PRS}(n_s)=\sum_{i=0}^{7}c(8\cdot n_s+i)\cdot 2^i$.

Here, c(i) denotes the pseudo-random sequence and is a cell-specific value. The pseudo-random sequence generator may be initialized to $$c_{init} = \left\lfloor \frac{N_{ID}^{cell}}{30} \right\rfloor \cdot 2^5 + f_{ss}^{PUSCH}$$

at the beginning of a radio frame.

Table 3 shows a cyclic shift field and $n_{DMRS}^{(2)}$ in downlink control information (DCI) format 0.

TABLE 3

| Cyclic shift field in DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

A physical mapping method for an uplink RS in a PUSCH will now be described.

A sequence is multiplied by amplitude scaling factor $\beta_{PUSCH}$ and mapped to the same set of a physical resource block (PRB) used for the corresponding PUSCH in a sequence starting with $r^{PUSCH}(0)$. The sequence is mapped to a resource element (k,l) in a subframe in such a manner that the order of k increases first and then the slot number increases, with l=3 for normal CP and l=2 for extended CP.

That is, a ZC sequence is used with cyclic extension for a length of greater than $3N_{sc}^{RB}$ whereas a computer generated sequence is used for a length of less than $3N_{sc}^{RB}$. A cyclic shift is determined according to cell-specific cyclic shift, UE-specific cyclic shift and hopping pattern.

Figure 12A:
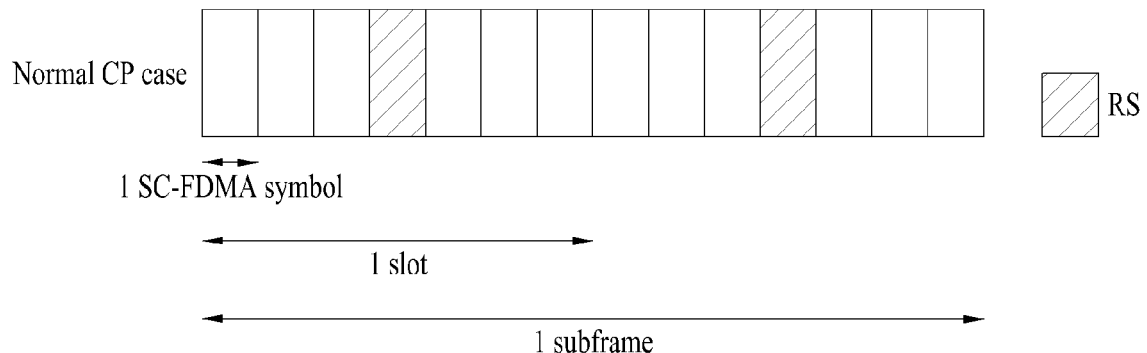
FIG. 12 illustrates a demodulation reference signal (DMRS) structure for a PUSCH.
Figure 12B:
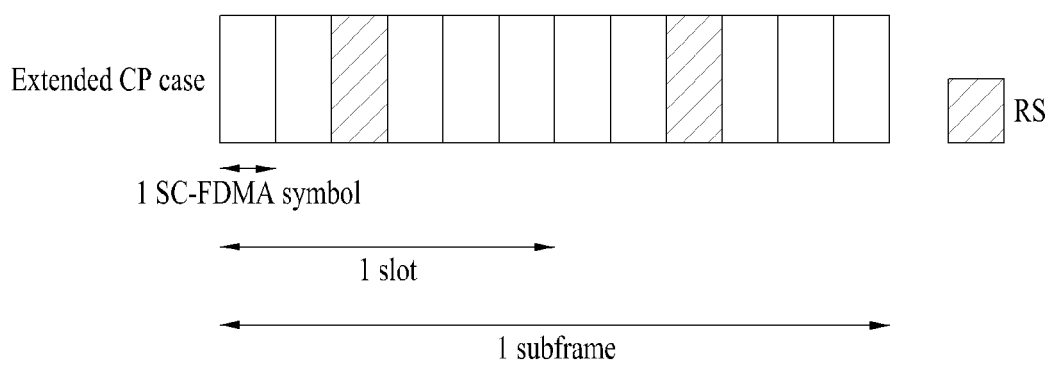

FIG. 12a shows a DMRS structure for a PUSCH in case of normal CP and FIG. 12b shows a DMRS structure for the PUSCH in case of extended CP. A DMRS is transmitted through fourth and eleventh SC-FDMA symbols in the case of FIG. 12a and transmitted through third and ninth SC-FDMA symbols in the case of FIG. 12b.

FIGS. 13 to 16 illustrate slot level structures of PUCCH formats. A PUCCH has the following formats in order to transmit control information.

(1) Format 1: used for on-off keying (OOK) modulation and scheduling request (SR).

(2) Formats 1a and 1b: used for ACK/NACK transmission.

1) Format 1a: BPSK ACK/NACK for one codeword

2) Format 1b: QPSK ACK/NACK for two codewords (3) Format 2: used for QPSK modulation and CQI transmission.

(4) Formats 2a and 2b: used for simultaneous transmission of CQI and ACK/NACK

Table 4 shows modulation schemes according to PUCCH format and the number of bits per subframe. Table 5 shows the number of RSs per slot according to PUCCH format and Table 6 shows SC-FDMA symbol position in an RS according to PUCCH format. In Table 4, PUCCH formats 2a and 2b correspond to normal CP.

TABLE 4

| PUCCH format | Modulation scheme | Number of bits per subframe ($M_{bit}$) |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH format | Normal CP | Extended CP |
|---|---|---|
| 1, 1a, 1b | 3 | 2 |
| 2 | 2 | 1 |
| 2a, 2b | 2 | N/A |

TABLE 6

| | SC-FDMA symbol position in RS | |
|---|---|---|
| PUCCH format | Normal CP | Extended CP |
| 1, 1a, 1b | 2, 3, 4 | 2, 3 |
| 2, 2a, 2b | 1, 5 | 3 |

Figure 13:
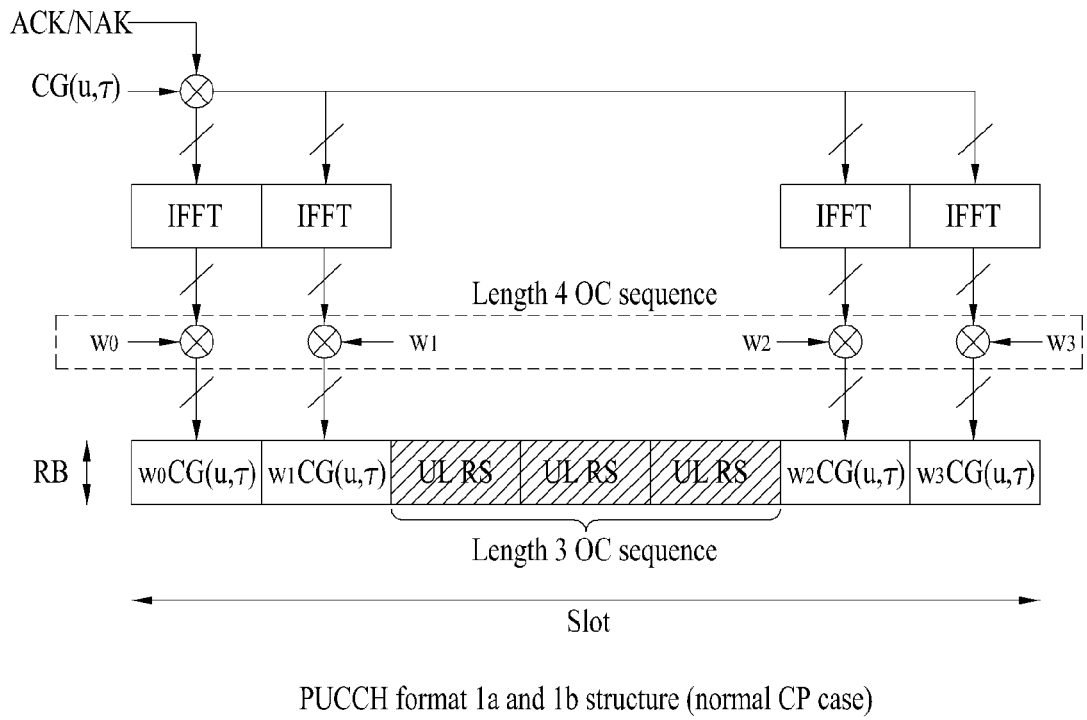
FIGS. 13 and 14 illustrate slot level structures of PUCCH formats 1a and 1b.
Figure 14:
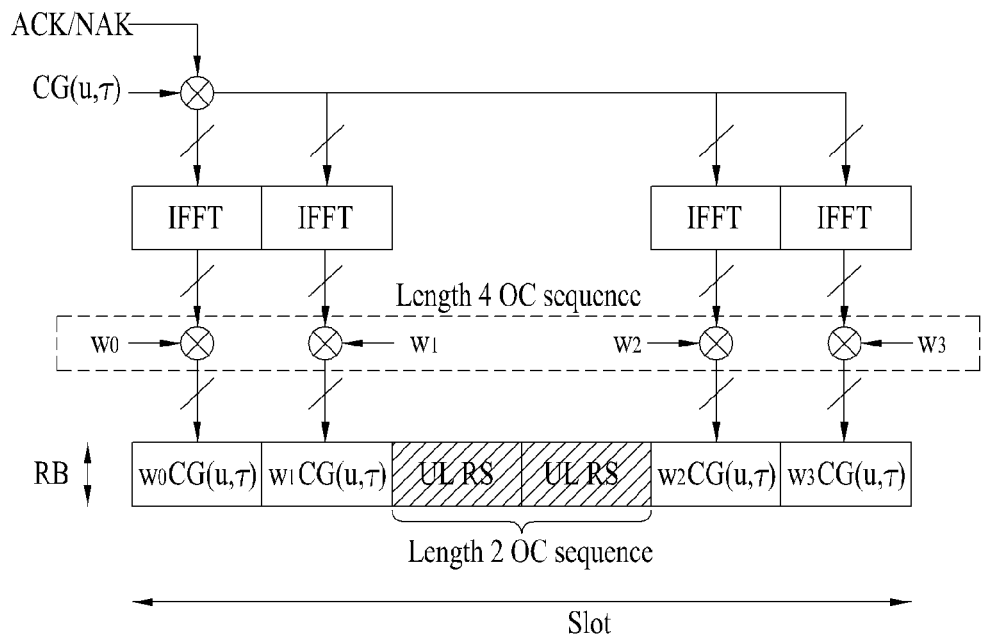

FIG. 13 illustrates PUCCH formats 1a and 1b in case of normal CP and FIG. 14 illustrates PUCCH formats 1a and 1b in case of extended CP. In PUCCH formats 1a and 1b, the same control information is repeated in a subframe on a slot-by-slot basis. ACK/NACK signals are respectively transmitted from UEs through different resources composed of different cyclic shifts (CSs) (frequency domain codes) and orthogonal cover codes (OCs or OCCs) (time domain spreading codes) of a computer-generated constant amplitude zero auto correlation (CG-CAZAC) sequence. An OC includes a Walsh/DFT orthogonal code, for example. If the number of CSs is 6 and the number of OCs is 3, a total of 18 UEs can be multiplexed in the same physical resource block (PRB) on a single antenna basis. Orthogonal sequence w0, w1, w2, w3 may be applied in an arbitrary time domain (after FFT) or in an arbitrary frequency domain (prior to FFT).

An ACK/NACK resource composed of a CS, OC and PRB may be given to a UE through radio resource control (RRC) for SR and persistent scheduling. The ACK/NACK resource may be implicitly provided to the UE by a lowest CCE index of a PUCCH corresponding to a PDSCH for dynamic ACK/NACK and non-persistent scheduling.

Figure 15:
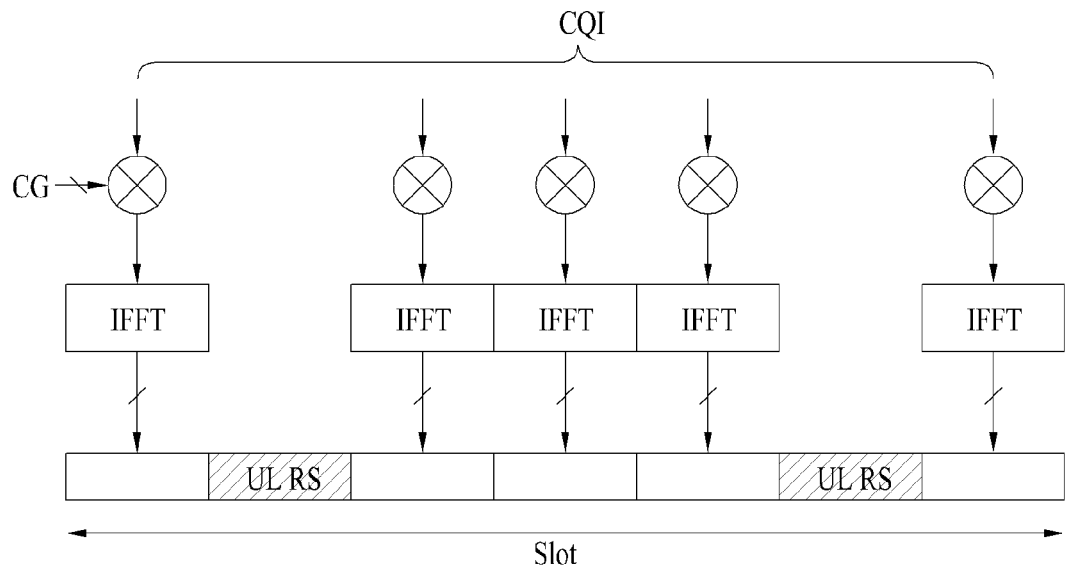
FIGS. 15 and 16 illustrate slot level structures of PUCCH formats 2/2a/2b.
Figure 16:
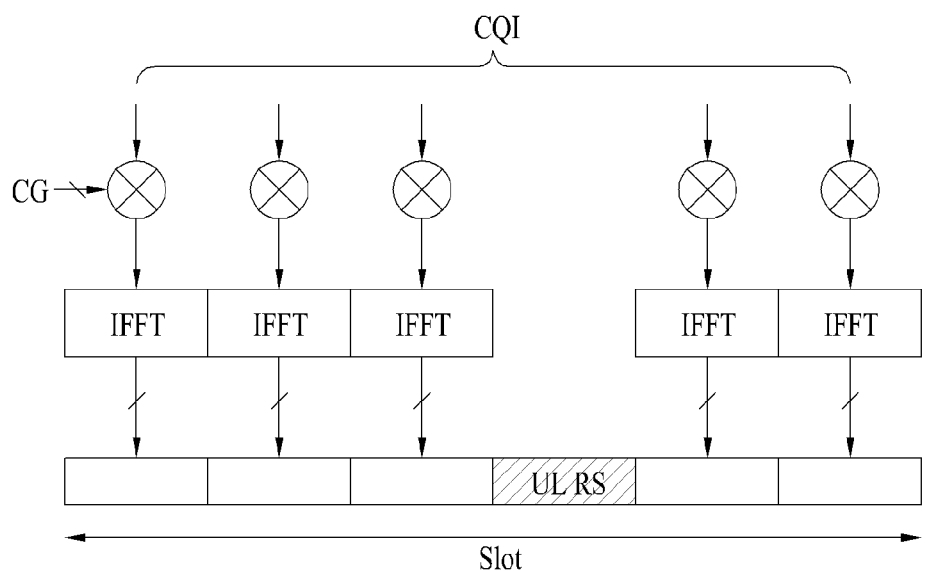

FIG. 15 illustrates PUCCH formats 2/2a/2b in case of normal CP and FIG. 16 illustrates PUCCH formats 2/2a/2b in case of extended CP. Referring to FIGS. 15 and 16, one subframe includes 10 QPSK data symbols in addition to RS symbols in case of normal CP. Each of the QPSK symbols is spread in the frequency domain according to CS and then mapped to a corresponding SC-FDMA symbol. SC-FDMA symbol level CS hopping may be applied to randomize inter-cell interference. An RS may be multiplexed according to CDM using CSs. For example, if the number of available CSs is 12 or 6, 12 or 6 UEs can be multiplexed in the same PRB. That is, a plurality of UEs can be multiplexed according to CS+OC+PRB and CS+PRB in PUCCH formats 1/1a/1b and 2/2a/2b.

Orthogonal sequences with length-4 and length-3 for PUCCH formats 1/1a/1b are shown in Table 7 and Table 8.

TABLE 7

Length-4 orthogonal sequences for PUCCH formats 1/1a/1b

| Sequence index $n_{oc}(n_s)$ | Orthogonal sequences $[w(0) \ldots w(N_{SF}^{PUCCH}-1)]$ |
|---|---|
| 0 | [+1 +1 +1 +1] |
| 1 | [+1 −1 +1 −1] |
| 2 | [+1 −1 −1 +1] |

TABLE 8

Length-3 orthogonal sequences for PUCCH formats 1/1a/1b

| Sequence index $n_{oc}(n_s)$ | Orthogonal sequences $[w(0) \ldots w(N_{SF}^{PUCCH}-1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequences for an RS in PUCCH formats 1/1a/1b are shown in Table 9.

TABLE 9

| | 1a and 1b | |
|---|---|---|
| Sequence index $\bar{n}_{oc}(n_s)$ | Normal cyclic prefix | Extended cyclic prefix |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

FIG. 17 illustrates ACK/NACK channelization for PUCCH formats 1a and 1b. FIG. 17 corresponds to a case of $\Delta_{shift}^{PUCCH}=2$.

Figure 18:
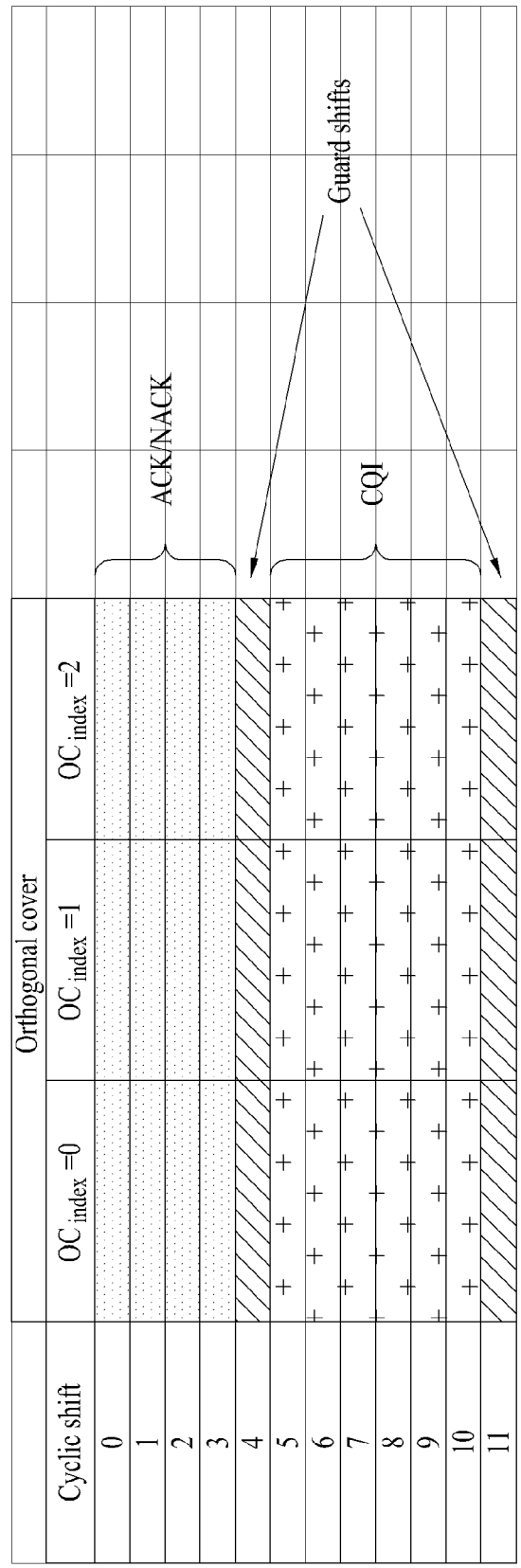
FIG. 18 illustrates channelization for a hybrid structure of PUCCH formats 1/1a/1b and 2/2a/2b in the same PRB.

FIG. 18 illustrates channelization for a hybrid structure of PUCCH formats 1/1a/1b and 2/2a/2b in the same PRB.

CS hopping and OC remapping may be applied as follows.

(1) Symbol-based cell-specific CS hopping for randomization of inter-cell interference (2) Slot level CS/OC remapping 1) For inter-cell interference randomization 2) Slot-based access for mapping between ACK/NACK channels and resources (k)

Resource $n_r$ for PUCCH formats 1/1a/1b includes the following combination.

(1) CS (corresponding to a DFT orthogonal code at a symbol level) $n_{cs}$ (2) OC (orthogonal code at a slot level) $n_{oc}$ (3) Frequency resource block (RB) $n_{rb}$ When indexes indicating CS, OC and RB are $n_{cs}$, $n_{oc}$, and $n_{rb}$, respectively, a representative index $n_r$ includes $n_{cs}$, $n_{oc}$, and $n_{rb}$. Here, $n_r$ satisfies $n_r=(n_{cs}, n_{oc}, n_{rb})$.

A combination of CQI, PMI, RI and ACK/NACK may be transmitted through PUCCH formats 2/2a/2b. In this case, Reed-Muller (RM) channel coding is applicable.

For example, channel coding for a UI CQI in an LTE system is described as follows. Bit stream $a_0, a_1, a_2, a_3, \ldots, a_{A-1}$ is channel-coded using RM code (20,A). Table 10 shows a base sequence for code (20,A). Here, $a_0$ and $a_{A-1}$ denote a most significant bit (MSB) and a least significant bit (LSB). In the case of extended CP, a maximum number of information bits is 11 in cases other than a case in which CQI and ACK/NACK are simultaneously transmitted. The UI CQI may be subjected to QPSK after being coded into 20 bits using the RM code. The coded bits may be scrambled before being subjected to QPSK.

TABLE 10

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel-coded bits $b_0, b_1, b_2, b_3, \ldots b_{B-1}$ may be generated according to Expression 9.

$$b_i = \sum_{n=0}^{A-1} (a_n \cdot M_{i,n}) \bmod 2 \qquad \text{[Expression 9]}$$

Here, $i = 0, 1, 2, \ldots, B-1$.

Table 11 shows an uplink control information (UCI) field for wideband (single antenna port, transmit diversity or open loop spatial multiplexing PDSCH) CQI feedback.

TABLE 11

| Field | Band |
|---|---|
| Wideband CQI | 4 |

Table 12 shows a UCI field for wideband CQI and PMI feedback. This field reports closed loop spatial multiplexing PDSCH transmission.

TABLE 12

| | Band | | | |
|---|---|---|---|---|
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI(Precoding Matrix Index) | 2 | 1 | 4 | 4 |

Table 13 shows a UCI field for RI feedback for wideband report.

TABLE 13

| | Bit widths | | |
|---|---|---|---|
| | | 4 antenna ports | |
| Field | 2 antenna ports | Maximum 2 layers | Maximum 4 layers |
| RI (Rank Indication) | 1 | 1 | 2 |

Figure 19:
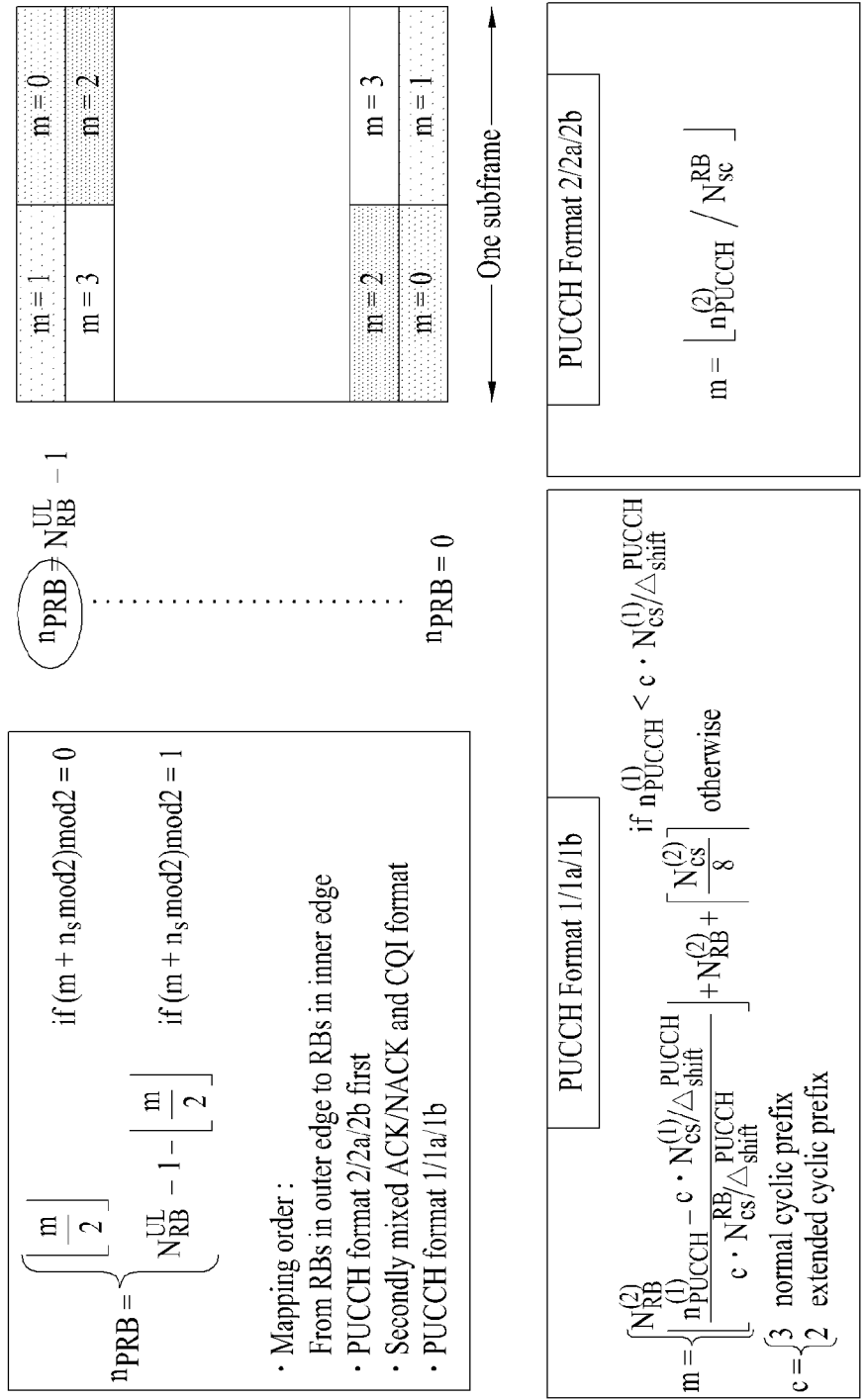
FIG. 19 illustrates PRB allocation for PUCCH transmission.

FIG. 19 illustrates PRB allocation. As shown in FIG. 19, a PRB may be used for PUCCH transmission in slot $n_s$.

A multi-carrier system or a carrier aggregation system means a system using aggregation of a plurality of carriers having a bandwidth narrower than a target bandwidth for supporting a wideband. When the plurality of carriers having a bandwidth narrower than the target bandwidth are aggregated, the bandwidth of the aggregated carriers may be limited to the bandwidths used in existing systems for backward compatibility with the existing systems. For example, an LTE system supports bandwidths of 1.4 MHz, 3 MHz, 5 MHz, 10 MHz, 15 MHz and 20 MHz and an LTE-A system evolved from the LTE system can support bandwidths wider than 20 MHz using bandwidths supported by the LTE system. Alternatively, a new bandwidth may be defined to support carrier aggregation irrespective of the bandwidths used in existing systems. The term 'multi-carrier' can be used with carrier aggregation and bandwidth aggregation. Carrier aggregation includes both contiguous carrier aggregation and non-contiguous carrier aggregation.

Figure 20:
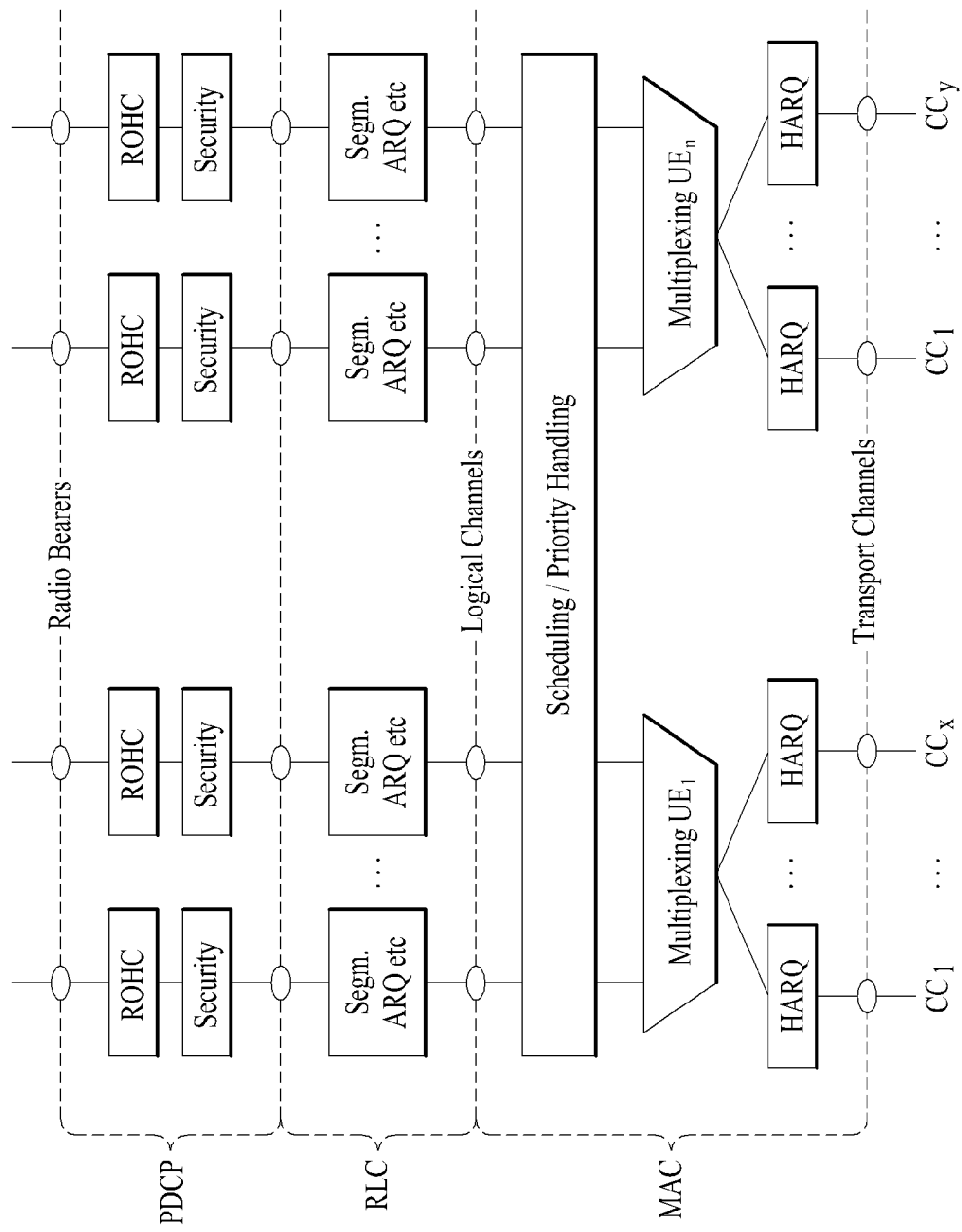
FIG. 20 illustrates a concept of management of downlink component carriers in a base station (BS)
Figure 21:
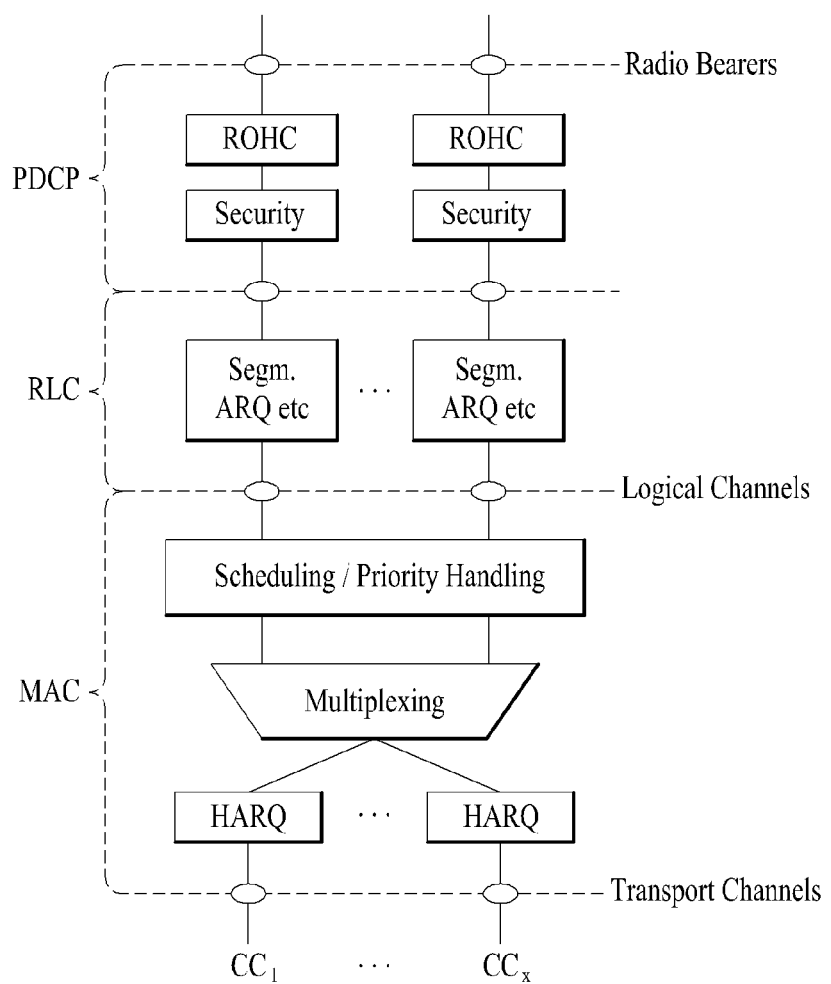
FIG. 21 illustrates a concept of management of uplink component carriers in a user equipment (UE)

FIG. 20 illustrates a concept of management of downlink component carriers in a BS and FIG. 21 illustrates a concept of management of uplink component carriers in a UE. For convenience, a higher layer is a MAC layer in the following description.

Figure 22:
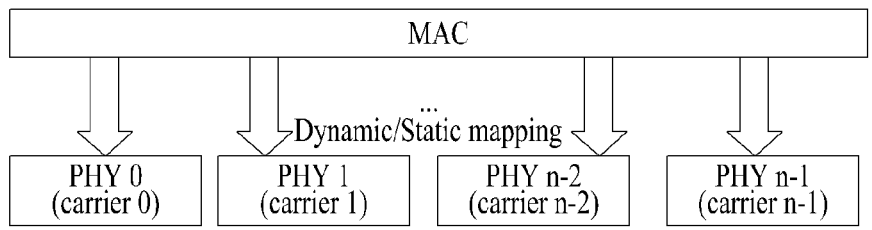
FIG. 22 illustrates a concept of management of multiple carriers by one MAC layer in a BS.
Figure 23:
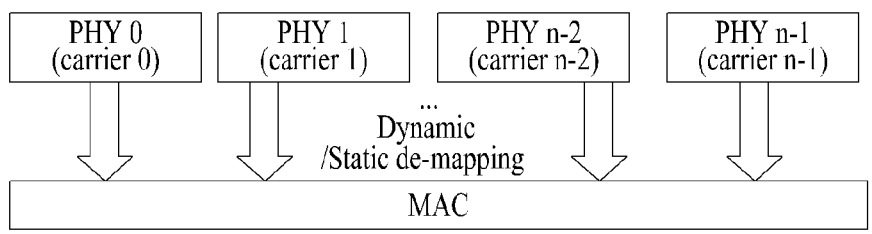
FIG. 23 illustrates a concept of management of multiple carriers by one MAC layer in a UE.

FIG. 22 illustrates a concept of management of multiple carriers by one MAC layer in a BS and FIG. 23 illustrates a concept of management of multiple carriers by MAC layer in a UE.

Referring to FIGS. 22 and 23, one MAC layer manages and operates one or more frequency carriers for transmission and reception. In this case, resource management is flexible because frequency carriers managed by one MAC layer need not be contiguous. In FIGS. 22 and 23, one PHY layer corresponds to one component carrier. Here, one PHY layer does not necessarily mean an independent radio frequency (RF) device. While one independent RF device means one PHY layer in general, one RF device is not limited thereto and may include multiple PHY layers.

Figure 24:
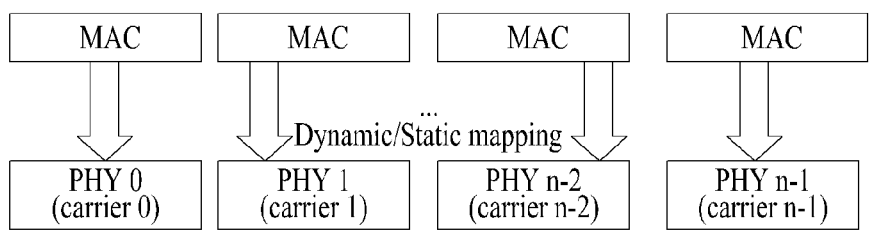
FIG. 24 illustrates a concept of management of multiple carriers by one MAC layer in a BS.
Figure 25:
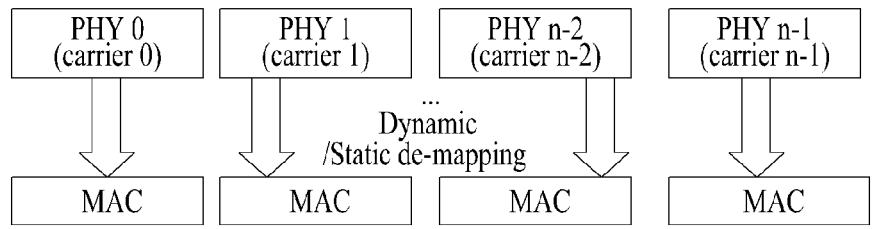
FIG. 25 illustrates a concept of management of multiple carriers by multiple MAC layers in a UE.
Figure 26:
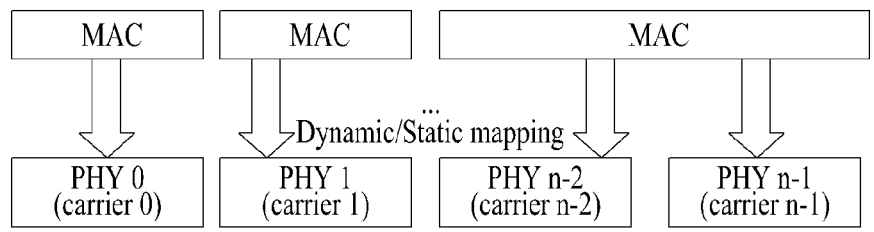
FIG. 26 illustrates a concept of management of multiple carriers by multiple MAC layers in a BS.
Figure 27:
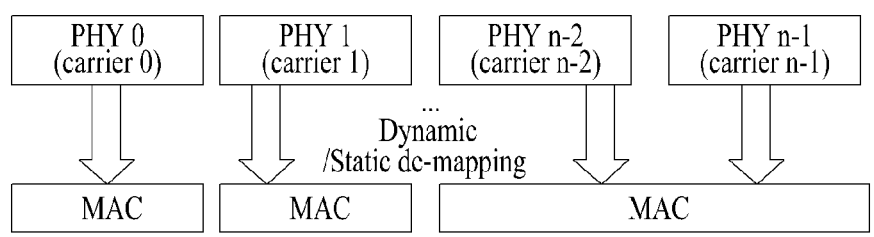
FIG. 27 illustrates a concept of management of multiple carriers by one or more MAC layers in a UE.

FIG. 24 illustrates a concept of management of multiple carriers by multiple MAC layers in a BS and FIG. 25 illustrates a concept of management of multiple carriers by multiple MAC layers in a UE. FIG. 26 illustrates a concept of management of multiple carriers by multiple MAC layers in a BS and FIG. 27 illustrates a concept of management of multiple carriers by one or more MAC layers in a UE.

Distinguished from the structures shown in FIGS. 22 and 23, multiple carriers may be controlled by multiple MAC layers as shown in FIGS. 24 to 27.

Multiple MAC layers may control one-to-one multiple carriers as shown in FIGS. 24 and 25. Referring to FIGS. 26 and 27, MAC layers may control one-to-one some carriers and one MAC layer may control other carriers.

The above-described system includes one to N carriers which are contiguous or non-contiguous. This can be applied in uplink and downlink. A TDD system is constructed such that N carriers for downlink transmission and uplink transmission are operated and an FDD system is constructed such that multiple carriers are respectively used for uplink and downlink. The FDD system may support asymmetrical carrier aggregation in which the number of aggregated carriers and/or a carrier bandwidth in uplink is different from those in downlink.

When the number of aggregated component carriers in uplink equals that in downlink, it is possible to configure all component carriers such that they are compatible with existing systems. However, component carriers that do not consider compatibility are not excluded from the present invention.

While the following description is made on the assumption that, when a PDCCH is transmitted using downlink component carrier #0, a PDSCH corresponding to the PDCCH is transmitted through downlink component carrier #0, it is apparent that the PDSCH can be transmitted through a different downlink component carrier using cross-carrier scheduling. The term "component carrier" can be replaced with an equivalent term (e.g. cell).

Figure 28:
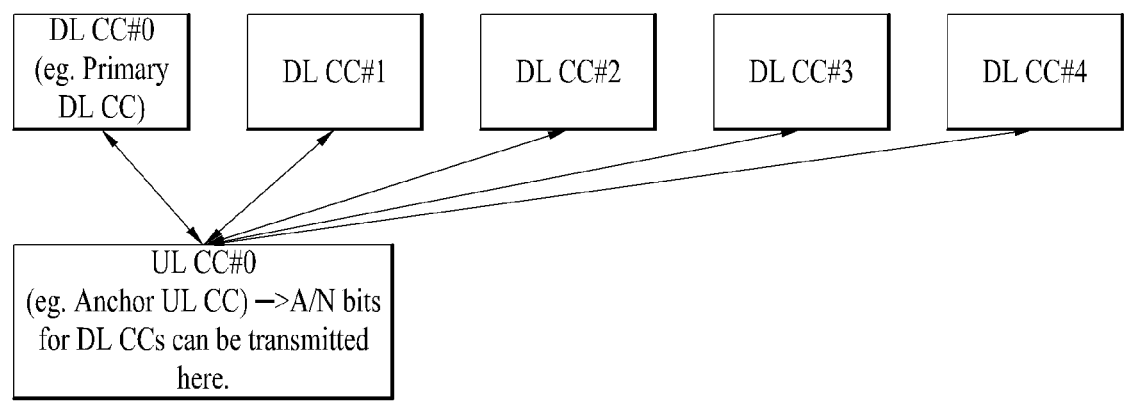
FIG. 28 illustrates asymmetrical carrier aggregation in which a plurality of DL CCs is linked to one UL CC.

FIG. 28 illustrates a scenario of transmitting UCI in a wireless communication system that supports carrier aggregation. This scenario is based on the assumption that UCI is ACK/NACK information. However, this is exemplary and UCI can include control information such as channel status information (e.g. CQI, PMI, RI, etc.) and scheduling request information (e.g. SR).

FIG. 28 illustrates asymmetrical carrier aggregation in which 5 DL CCs are linked to one UL CC. This asymmetrical carrier aggregation may be set from the viewpoint of UCI transmission. That is, DL CC-UL CC linkage for the UCI and DL CC-UL CC linkage for data may be different from each other. When it is assumed that one DL CC can transmit a maximum of two codewords, at least two UL ACK/NACK bits are needed. In this case, at least 10 ACK/NACK bits are necessary to transmit ACK/NACK information for data, received through 5 DL CCs, using one UL CC. If DTX status is also supported for each DL CC, at least 12 bits (=5^5=3125=11.6 bits) are needed for ACK/NACK transmission. The conventional PUCCH formats 1a/1b can transmit ACK/NACK information having a maximum of 2 bits, and thus it cannot transmit ACK/NACK information having an increased number of bits. While it has been described that carrier aggregation increases the quantity of UCI, an increase in the number of antennas, presence of a backhaul subframe in a TDD system and a relay system, etc. may cause an increase in the quantity of UCI. Similarly to ACK/NACK information, when control information related to a plurality of DL CCs is transmitted through one UL CC, the quantity of the control information increases. For example, when CQI related to a plurality of DL CCs is transmitted through a UL anchor (or primary) CC, a CQI payload may increase. A DL CC and a UL CC may also be respectively called a DL cell and a UL cell and an anchor DL CC and an anchor UL CC may be respectively called a DL primary cell (PCell) and a UL PCell.

The DL primary CC may be defined as a DL CC linked with the UL primary CC. Here, linkage includes both implicit linkage and explicit linkage. In LTE, one DL CC and one UL CC are uniquely paired. For example, a DL CC linked with the UL primary CC according to LTE paring can be called the DL primary CC. This can be regarded as implicit linkage. Explicit linkage means that a network configures a linkage in advance and it may be signaled through RRC. In explicit linkage, a DL CC paired with the UL primary CC may be called the DL primary CC. Here, the UL primary (anchor) CC may be a UL CC that carries a PUCCH. Otherwise, the UL primary CC may be a UL CC that carries UCI over a PUCCH or a PUSCH. The DL primary CC can be configured through higher layer signaling. The DL primary CC may be a DL CC through which a UE performs initial access. DL CCs other than the DL primary CC can be called DL secondary CCs. Similarly, UL CCs other than the UL primary CC can be called UL secondary CCs.

Embodiment 1

PUCCH formats proposed by 3GPP so far to transmit an increased quantity of UCI are as follows. These PUCCH formats are called CA (carrier aggregation) PUCCH formats for convenience. However, CA PUCCH formats are not limited to CA. For example, when the quantity of UCI is increased due to relay communication and TDD, the CA PUCCH formats described in the specification include PUCCH formats used to transmit the UCI.

1. Channel Selection

A specific resource is selected from a plurality of resources defined for RS+UCI and a UCI modulation value is transmitted through the selected resource. Table 14 is a mapping table when 3-bit ACK/NACK is transmitted using channel selection. QPSK is used as a modulation method.

TABLE 14

| ACK/ | Ch1 | | Ch2 | |
|---|---|---|---|---|
| NACK | RS | UCI | RS | UCI |
| N, N, N | 1 | 1 | 0 | 0 |
| N, N, A | 1 | −j | 0 | 0 |
| N, A, N | 1 | j | 0 | 0 |
| N, A, A | 1 | −j | 0 | 0 |
| A, N, N | 0 | 0 | 1 | 1 |
| A, N, A | 0 | 0 | 1 | −j |
| A, A, N | 0 | 0 | 1 | j |
| A, A, A | 0 | 0 | 1 | −1 |

Here, Ch1 and Ch2 denote PUCCH resources occupied for ACK/NACK transmission. 1, −1, j and −j are QPSK modulation values.

2. Enhanced Channel Selection

Resources for an RS and UCI are separately selected from a plurality of resources defined for RS+UCI and a UCI modulation value is transmitted through the selected resource. Table 15 is a mapping table when a 3-bit ACK/NACK is transmitted through enhanced channel selection. BPSK is used as a modulation method.

TABLE 15

| ACK/NACK | Ch1 RS | Ch1 UCI | Ch2 RS | Ch2 UCI |
|---|---|---|---|---|
| N, N, N | 1 | 1 | 0 | 0 |
| N, N, A | 1 | −1 | 0 | 0 |
| N, A, N | 0 | 1 | 1 | 0 |
| N, A, A | 0 | −1 | 1 | 0 |
| A, N, N | 1 | 0 | 0 | 1 |
| A, N, A | 1 | 0 | 0 | −1 |
| A, A, N | 0 | 0 | 1 | 1 |
| A, A, A | 0 | 0 | 1 | −1 |

Here, Ch1 and Ch2 denote PUCCH resources occupied for ACK/NACK transmission. 1 and −1 are BPSK modulation values.

3. SF (Spreading Factor) Reduction

Figure 29:
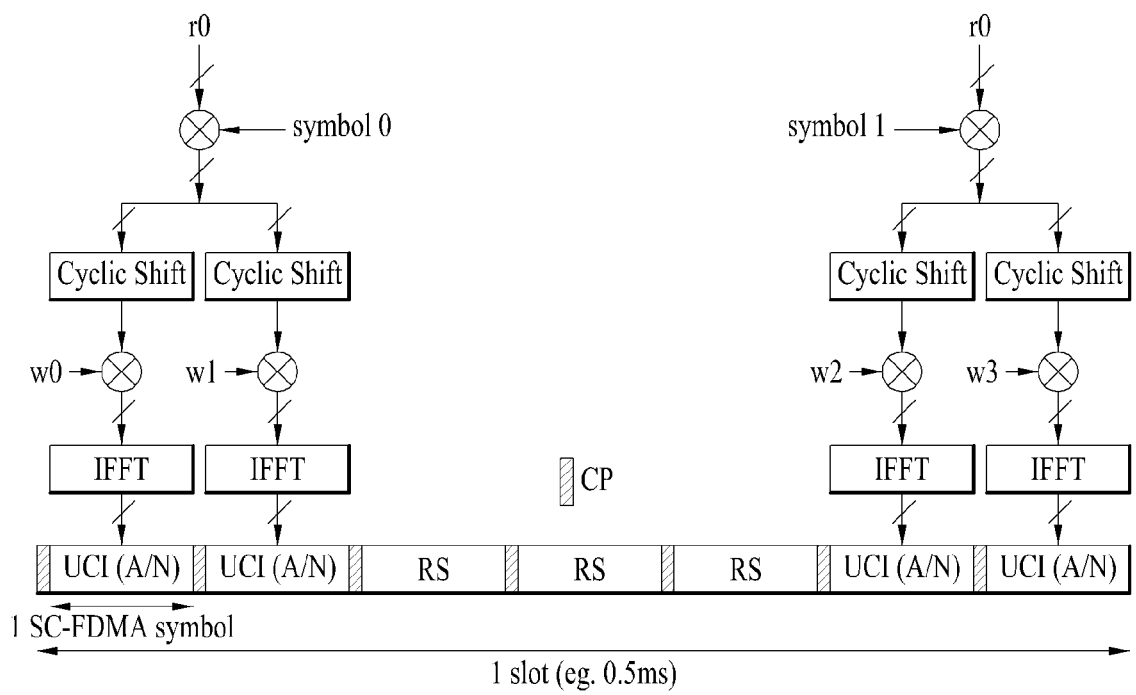
FIGS. 29, 30 and 31 illustrate a CA PUCCH format.

FIG. 29 illustrates a PUCCH format for transmitting UCI through SF reduction and a signal processing procedure for the same. While the basic procedure corresponds to the procedure described with reference to FIGS. 13 and 14, the procedure shown in FIG. 29 can transmit a larger number of modulation symbols (0, 1) by reducing an SF used in LTE PUCCH formats 1/1a/1b from 4 to 2. The number and positions of UCI/RS symbols shown in FIG. 29 can be changed according to system design.

4. Channel Selection with SF=2

This method is a combination of channel selection and SR reduction. Table 16 is a mapping table when a 4-bit ACK/NACK is transmitted using channel selection with SF=2. QPSK is used as a modulation scheme.

TABLE 16

| ACK/NACK | Ch1 RS | Ch1 UCI1 | Ch1 UCI2 | Ch2 RS | Ch2 UCI1 | Ch2 UCI2 |
|---|---|---|---|---|---|---|
| N, N, N, N | 1 | 1 | 1 | 0 | 0 | 0 |
| N, N, N, A | 1 | 1 | −j | 0 | 0 | 0 |
| N, N, A, N | 1 | 1 | j | 0 | 0 | 0 |
| N, N, A, A | 1 | 1 | −1 | 0 | 0 | 0 |
| N, A, N, N | 1 | −1 | 1 | 0 | 0 | 0 |
| N, A, N, A | 1 | −1 | −j | 0 | 0 | 0 |
| N, A, A, N | 1 | −1 | j | 0 | 0 | 0 |
| N, A, A, A | 1 | −1 | −1 | 0 | 0 | 0 |
| A, N, N, N | 0 | 0 | 0 | 1 | 1 | 1 |
| A, N, N, A | 0 | 0 | 0 | 1 | 1 | −j |
| A, N, A, N | 0 | 0 | 0 | 1 | 1 | j |
| A, N, A, A | 0 | 0 | 0 | 1 | 1 | −1 |
| A, A, N, N | 0 | 0 | 0 | 1 | −1 | 1 |
| A, A, N, A | 0 | 0 | 0 | 1 | −1 | −j |
| A, A, A, N | 0 | 0 | 0 | 1 | −1 | j |
| A, A, A, A | 0 | 0 | 0 | 1 | −1 | −1 |

Here, Ch1 and Ch2 denote PUCCH resources occupied for ACK/NACK transmission. 1, −1, j and −j are QPSK modulation values.

5. PUCCH Format 2

This is a transmission method using PUCCH format 2 of LTE. LTE PUCCH format 2 supports a maximum of 11 to 13 information bits.

6. DFT-s-OFDM Using Time Domain CDM

Figure 30:
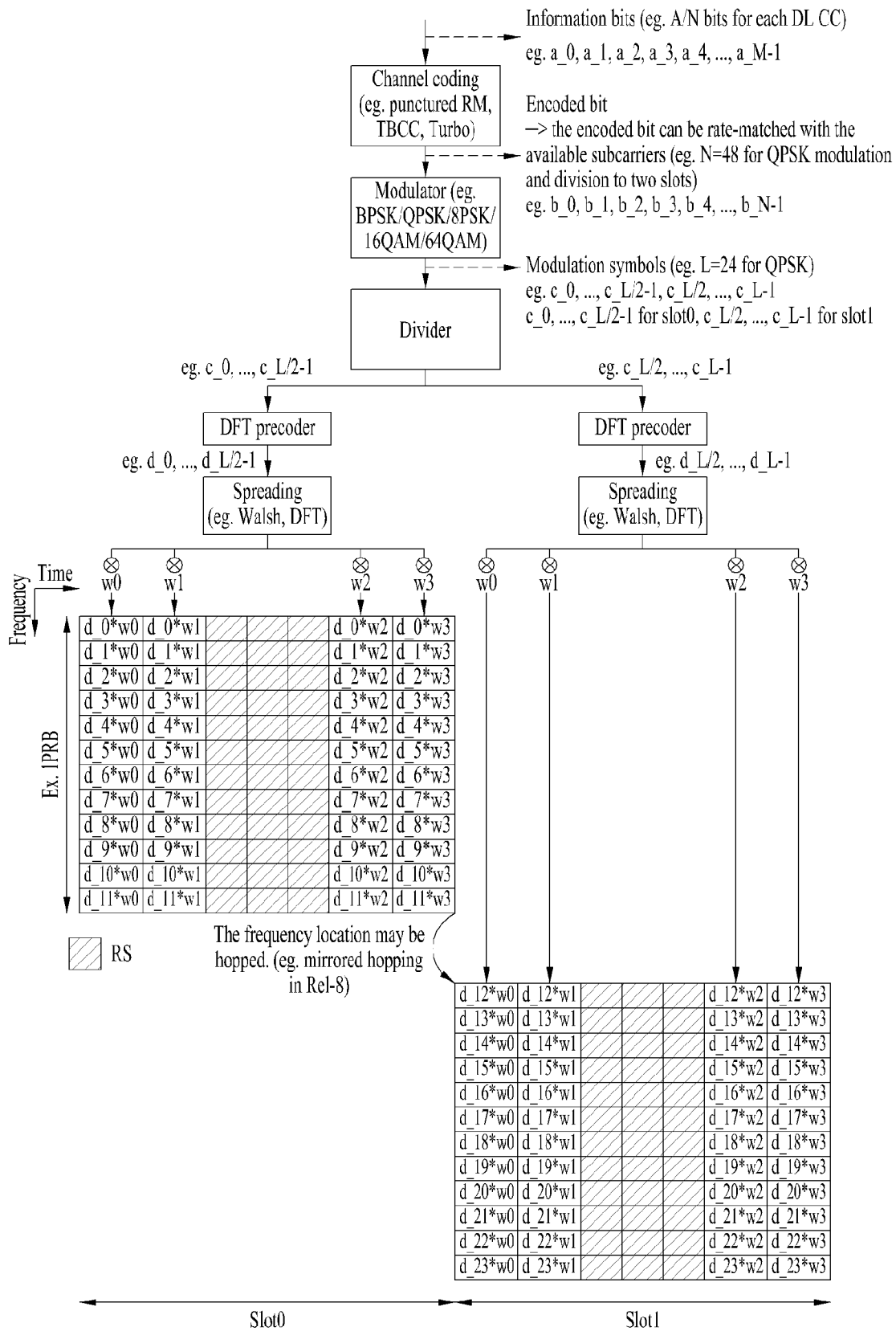

FIG. 30 illustrates a PUCCH format for transmitting UCI using DFT-s-OFDMA and time domain CDM and a signal processing procedure for the same. The number and positions of UCI/RS symbols shown in FIG. 30 can be changed according to system design.

Referring to FIG. 30, a channel coding block channel-encodes information bits $a\_0, a\_1, \ldots, a\_M-1$ (e.g. multiple ACK/NACK bits), thus creating coded bits (encoded bit or coding bit) (or codeword), $b\_0, b\_1, \ldots, b\_N-1$. M is the size of information bits and N is the size of coded bits. The information bits include UCI, for example, multiple ACKs/NACKs for a plurality of data (or PDSCHs) received on a plurality of DL CCs. Herein, the information bits $a\_0, a\_1, \ldots, a\_M-1$ are jointly encoded irrespective of the type/number/size of UCI that forms the information bits. For example, if the information bits include multiple ACKs/NACKs for a plurality of DL CCs, channel coding is performed on the entire bit information, rather than per DL CC or per ACK/NACK bit. A single codeword is generated by channel coding. Channel coding includes, without being limited to, repetition, simplex coding, RM coding, punctured RM coding, Tail-Biting Convolutional Coding (TBCC), Low-Density Parity-Check (LDPC) coding, or turbo coding. While not shown, the coded bits may be rate-matched, taking into account modulation order and the amount of resources. The rate matching function may be incorporated into the channel coding block or implemented in a separate functional block. For example, the channel coding block may produce a single codeword by performing (32, 0) RM coding on a plurality of pieces of control information and may subject the single codeword to cyclic buffer rate-matching.

A modulator generates modulation symbols $c\_0, c\_1, \ldots, c\_L-1$ by modulating the coded bits $b\_0, b\_1, \ldots, b\_M-1$. L is the size of modulation symbols. The modulation scheme may be n-Phase Shift Keying (n-PSK) or n-Quadrature Amplitude Modulation (QAM) (n is an integer of 2 or greater). More specifically, the modulation scheme may be BPSK, QPSK, 8-PSK, QAM, 16-QAM, or 64-QAM.

A divider divides the modulation symbols $c\_0, c\_1, \ldots, c\_L-1$ into slots. The order/pattern/scheme of dividing modulation symbols into slots is not limited to a specific one. For instance, the divider may divide the modulation symbols into slots, sequentially starting from the first modulation symbol. In this case, the modulation symbols $c\_0, c\_1, \ldots, c\_L/2-1$ may be allocated to slot 0 and the modulation symbols $c\_L/2, c\_L/2+1, \ldots, c\_L-1$ may be allocated to slot 1, as shown in FIG. 30. When the modulation symbols are allocated to the slots, they may be interleaved (or permuted). For example, even-numbered modulation symbols may be allocated to slot 0 and odd-numbered modulation symbols may be allocated to slot 1. Division may precede modulation.

A DFT precoder performs DFT precoding (e.g. 12-point DFT) on the modulation symbols allocated to the slots in order to generate a single carrier waveform. Referring to FIG. 30, the modulation symbols $c\_0, c\_1, \ldots, c\_L/2-1$ allocated to slot 0 are DFT-precoded to $d\_0, d\_1, \ldots, d\_L/2-1$ and the modulation symbols $c\_L/2, c\_L/2+1, \ldots, c\_L-1$ allocated to slot 1 are DFT-precoded to $d\_L/2, d\_L/2+1, \ldots, d\_L-1$. DFT precoding may be replaced with another linear operation (e.g. Walsh precoding).

A spreading block spreads DFT signals at an SC-FDMA symbol level (in the time domain). The SC-FDMA symbol-level time-domain spreading is performed using a spreading code (sequence). The spreading code includes a quasi-orthogonal code and an orthogonal code. The quasi-orthogonal code includes, without being limited to, a PN (Pseudo Noise)

code. The orthogonal code includes, without being limited to, a Walsh code and a DFT code. While an orthogonal code is taken as a main example of the spreading code herein for convenience, the orthogonal code may be replaced with a quasi-orthogonal code. The maximum value of a spreading code size (or a Spreading Factor (SF)) is limited by the number of SC-FDMA symbols used to transmit control information. For example, if four SC-FDMA symbols carry control information in one slot, an orthogonal code of length 4, w0, w1, w2, w3 can be used in each slot. The SF means the degree to which control information is spread. The SF may be related to the multiplexing order or antenna multiplexing order of a UE. The SF may be changed to 1, 2, 3, 4, . . . depending on system requirements. An SF may be predefined between a BS and a UE or the BS may indicate an SF to the UE by DCI or RRC signaling. For example, if one of SC-FDMA symbols for control information is punctured to transmit an SRS, a spreading code with a decreased SF (e.g. SF=3 instead of SF=4) may be applied to the control information in a corresponding slot.

A signal generated from the above operation is mapped to subcarriers in a PRB and converted to a time-domain signal by IFFT. A CP is added to the time-domain signal and the resulting SC-FDMA symbols are transmitted through an RF end.

The signal processing procedure described with reference to FIG. 30 is exemplary and the signal mapped to the PRB can be obtained through various equivalent signal processing procedures. For example, the operation of the spreading block can precede the operation of the DFT precoder and the divider and the spreading block can be implemented as a single function block.

7. PUCCH Format 2 Using Multi-Sequence Modulation (MSM)

Figure 31:
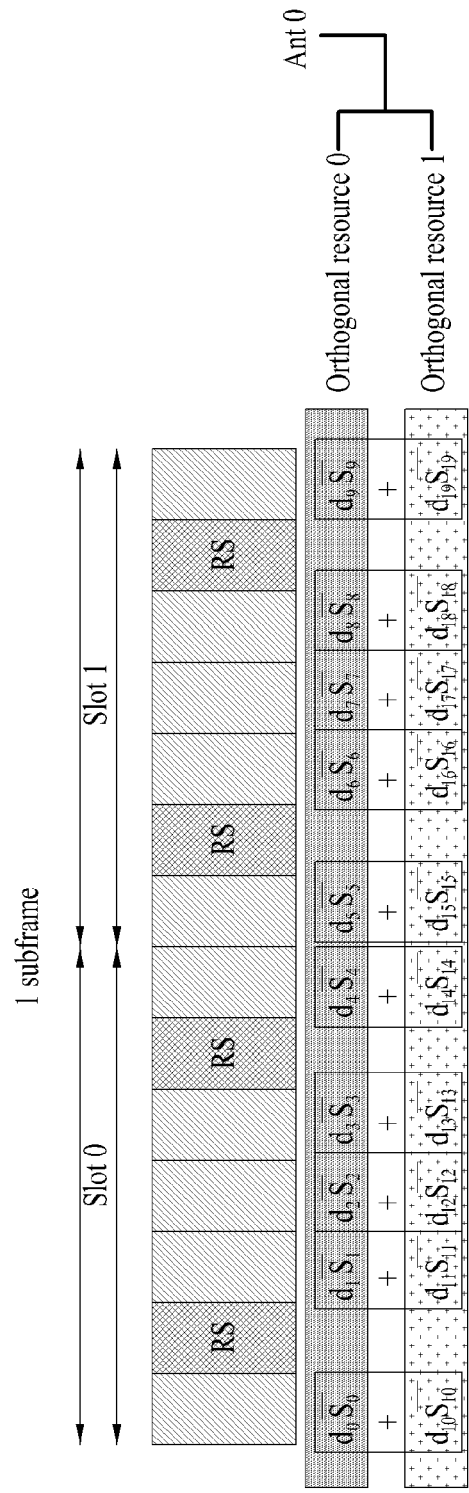

FIG. 31 illustrates a PUCCH format for transmitting UCI using PUCCH format 2 and MSM and a signal processing procedure for the same. MSM is allocated N PUCCH resources and performs modulation (e.g. QPSK, 8PSK, M-ary QAM, etc.) on each PUCCH resource.

Referring to FIG. 31, a symbol space may be extended using two orthogonal PUCCH resources and UCI may be transmitted through the extended symbol space. To prevent CM increase, the two PUCCH resources may be present in the same PRB. To minimize CM increase, the two orthogonal PUCCH resources may use the same PRB index and the same OC index and use different cyclic shifts. That is, MSM can be used according to different cyclic shifts of the PUCCH resources. The cyclic shifts may be adjacent values or values spaced $\Delta_{shift}^{PUCCH}$ apart. In the case of the structure shown in FIG. 31, information of up to 40 bits can be transmitted when a coding rate is 1 and QPSK is used.

Figure 32:
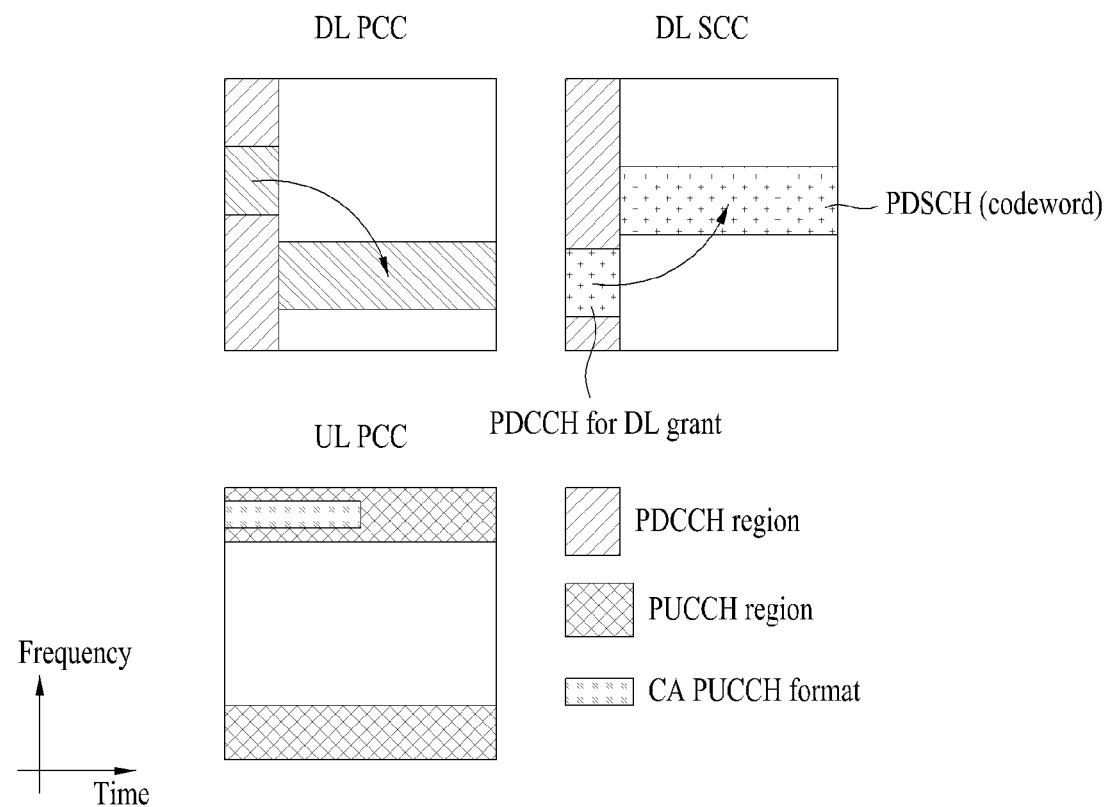
FIG. 32 illustrates signal transmission through a CA PUCCH.

FIG. 32 illustrates signal transmission using a CA PUCCH format.

Referring to FIG. 32, a DL primary component carrier (PCC) and a DL secondary component carrier (SCC) are present. The DL PCC may be linked with a UL PCC. It is assumed that each of the DL PCC and DL SCC includes a DL grant and a PDCCH is transmitted on a DL CC of each of the DL PCC and DL SCC. If each DL CC carries two codewords (a total of four codewords), 4 bits when DTX state is not reported and 5 bits when DTX state is reported may be transmitted on the UL PCC through the CA PUCCH format.

To feed back multiple ACKs/NACKs, resources different from those used by an LTE UE need to be used. This adds additional overhead to resource overhead of LTE.

To solve this problem, the LTE PUCCH format/rule may be used when the number M of PDCCHs scheduled through a DL PCC (or DL SCC) is less than a specific value (integer greater than 1) and the CA PUCCH format/rule may be used in other cases. For example, if a PDCCH is detected from the DL PCC (DL SCC) only, the LTE PUCCH format/rule can be used when M=1. In this case, the CA PUCCH format/rule can be used when M≥2.

While a BS has transmitted M PDCCHs to a UE, the UE may detect (decode) only N (N≤M) PDCCHs. In this case, the UE may consider that the BS has transmitted the N PDCCHs through a DL PCC. Accordingly, the UE can feed back ACK/NACK information using the LTE rule and LTE PUCCH format upon detection of a single PDCCH (or PDSCH) and feed back ACK/NACK information using the CA PUCCH format/rule/resources upon two or more PDCCHs (or PDSCHs).

In the specification, the LTE PUCCH format/rule uses the PUCCH format 1a/1b (including channel selection and bundling) of FIGS. 14 and 15, for example, and includes implicit/dynamic allocation of PUCCH resources based on a smallest CCE index of a PDCCH used for DL scheduling. The CA PUCCH format/rule uses various formats (e.g. DFT with CDM and SF reduction to 2) that can be used to transmit an increased quantity of ACK/NACK information and includes explicit allocation of PUCCH resources. A CA PUCCH resource may be explicitly provided through higher layer signaling (e.g. RRC signaling and MAC signaling) or physical layer signaling (e.g. PDCCH). When the CA PUCCH resource is provided through higher layer signaling, the CA PUCCH resource may be semi-statically given.

FIGS. 33 and 34 illustrate transmission of control information (e.g. ACK/NACK) using the LTE PUCCH format/rule when a PDCCH is detected from a single DL CC and using the CA PUCCH format in other cases. For convenience, FIGS. 33 and 34 illustrate cases in which the LTE format/rule is used if a PDCCH is detected from a single DL CC and the CA PUCCH format is used if not.

Figure 33A:
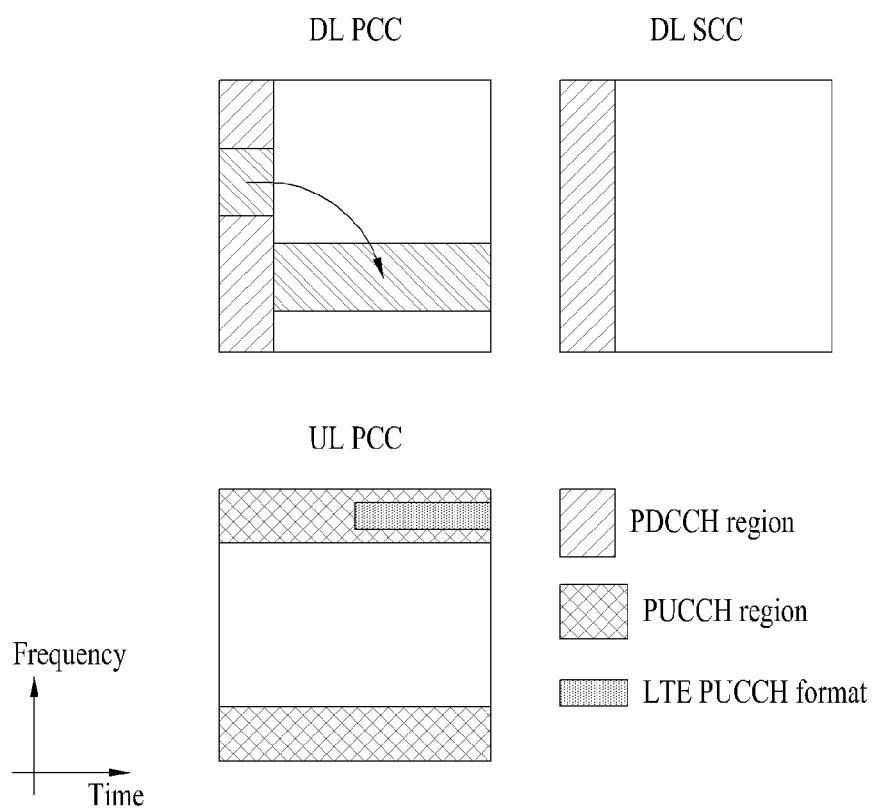
FIGS. 33 and 34 illustrate UCI transmission according to an embodiment of the present invention.
Figure 33B:
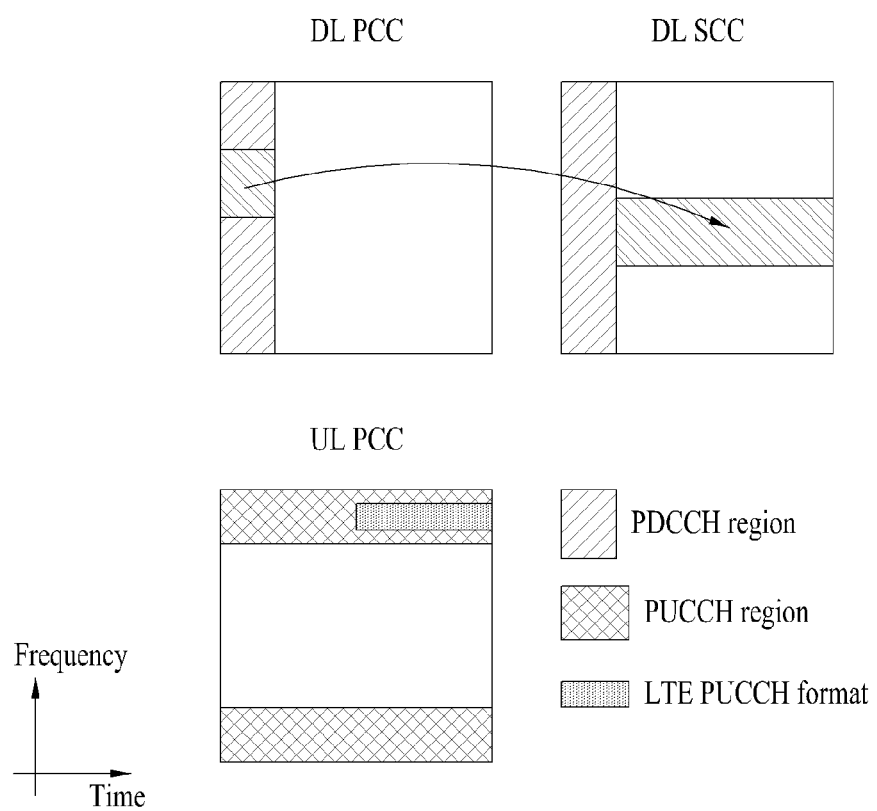
Figure 33C:
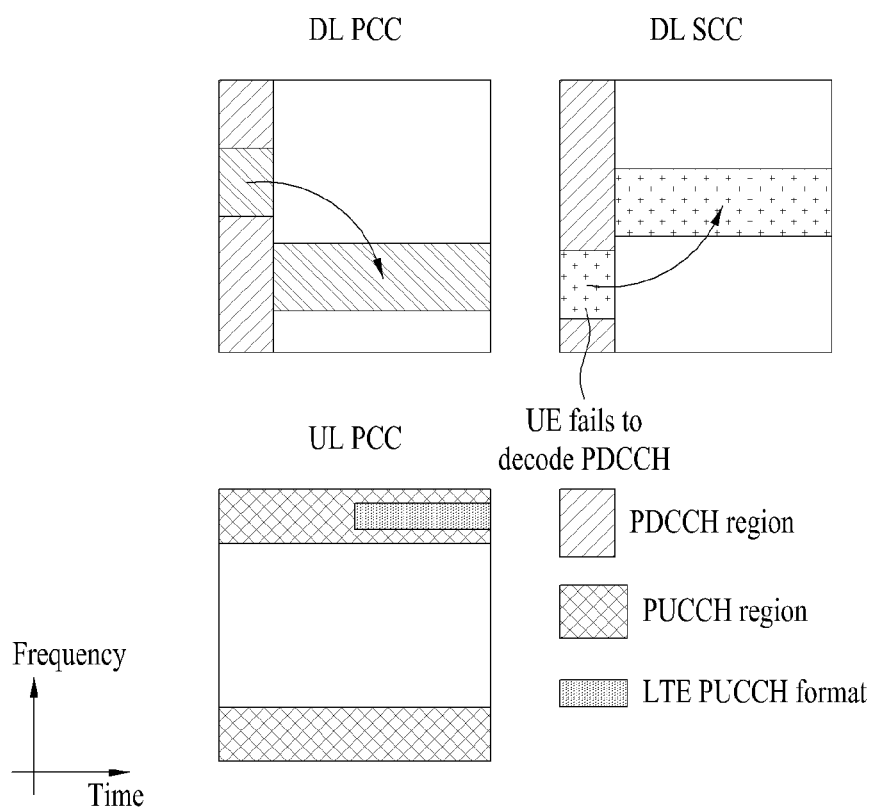

FIGS. 33a, 33b and 33c illustrate cases in which the LTE PUCCH format/rule is used when a PDCCH is received through a DL PCC.

Referring to FIG. 33a, the BS transmits a PDCCH on the DL PCC without CIF (M=1). This example illustrates non-cross carrier scheduling. The PDCCH on the DL PCC indicates a PDSCH transmitted on the DL PCC. The UE transmits ACK/NACK for the PDSCH received through the DL PCC using the LTE format/rule because the UE has detected only the PDCCH through the DL PCC (N=1).

Referring to FIG. 33b, the BS transmits a PDCCH on the DL PCC (M=1). This example shows cross carrier scheduling. A CIF field of the PDCCH indicates a DL SCC. That is, the PDCCH on the DL PCC indicates a PDSCH transmitted on the DL SCC. The UE transmits ACK/NACK for the PDSCH received through the DL SCC using the LTE format/rule because the UE has detected only the PDCCH through the DL PCC (N=1).

Referring to FIG. 33c, the BS transmits PDCCH0 on the DL PCC and transmits PDCCH1 on the DL SCC (M=2). PDCCH0 is for PDSCH0 transmitted on the DL PCC and PDCCH1 is for PDSCH1 transmitted on the DL SCC. The UE successfully detects PDCCH0 and fails to decode PDCCH1 (N=1). In this case, the UE transmits only ACK/NACK for the PDSCH received through the DL PCC using the LTE PUCCH format/rule since the UE has detected one PDCCH through the DL PCC.

Figure 34A:
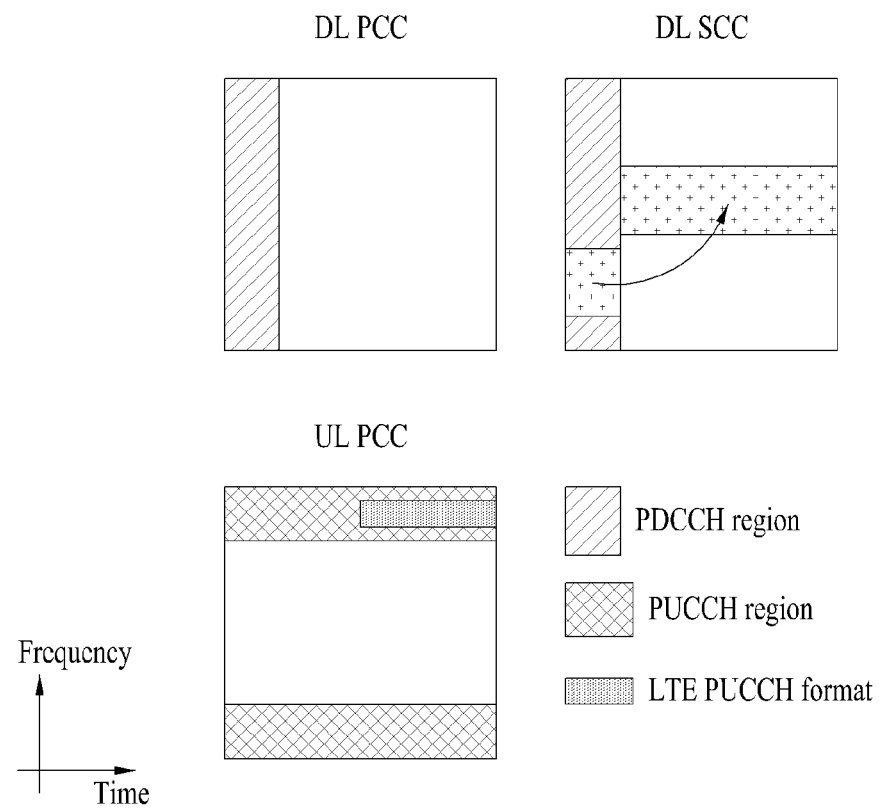
Figure 34B:
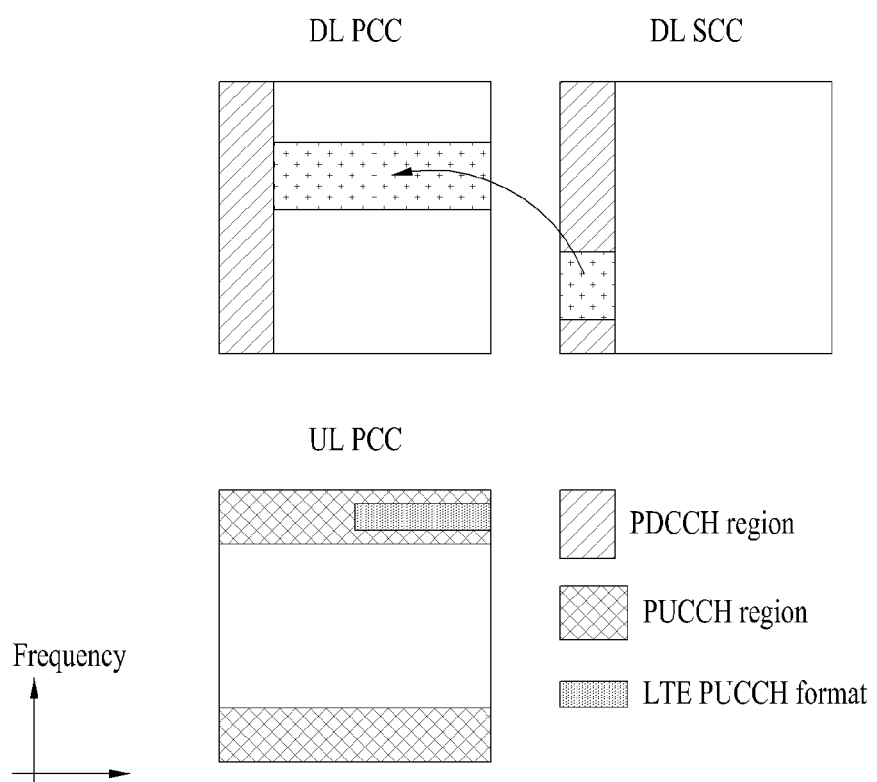
Figure 34C:
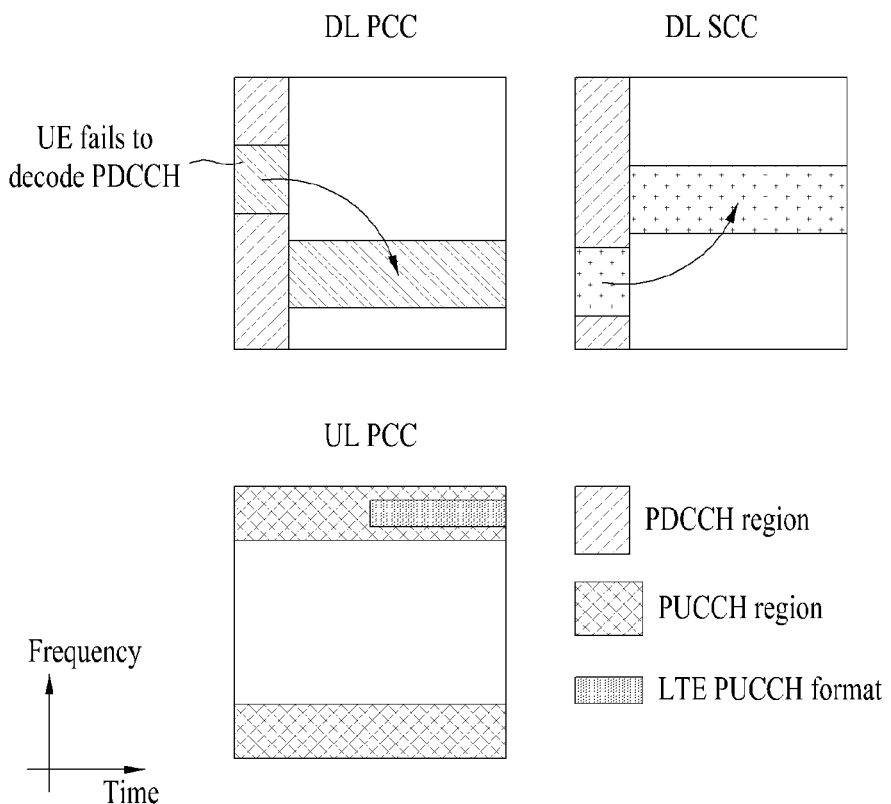

FIGS. 34a, 34b and 34c illustrate cases in which the LTE PUCCH format/rule is used when a PDCCH is received through a DL PCC.

Referring to FIG. 34a, the BS transmits a PDCCH on the DL SCC without CIF (M=1). This example illustrates non-cross carrier scheduling. The PDCCH on the DL SCC indicates a PDSCH transmitted on the DL SCC. The UE transmits ACK/NACK for the PDSCH received through the DL SCC using the LTE format/rule because the UE has detected only the PDCCH through the DL PCC (N=1).

Referring to FIG. 34b, the BS transmits a PDCCH on the DL SCC (M=1). This example shows cross carrier scheduling. A CIF field of the PDCCH indicates a DL PCC. That is, the PDCCH on the DL SCC indicates a PDSCH transmitted on the DL PCC. The UE transmits ACK/NACK for the PDSCH received through the DL PCC using the LTE format/rule because the UE has detected only the PDCCH through the DL SCC (N=1).

Referring to FIG. 34c, the BS transmits PDCCH0 on the DL PCC and transmits PDCCH1 on the DL SCC (M=2). PDCCH0 is for PDSCH0 transmitted on the DL PCC and PDCCH1 is for PDSCH1 transmitted on the DL SCC. The UE successfully detects PDCCH0 and fails to decode PDCCH1 (N=1). In this case, the UE can feed back ACK/NACK using the LTE PUCCH format/rule/resources because the UE has detected the PDCCH through the DL PCC only. In addition, since the UE has detected only one PDCCH through the DL SCC, the UE transmits only ACK/NACK for PDSCH1 received through the DL SCC using the LTE PUCCH format/rule.

While the cases in which control information (e.g. ACK/NACK) is transmitted using the LTE PUCCH format/rule when a PDCCH is detected through a DL CC have been described, the present invention is also applicable when a plurality of PDCCHs is detected through a DL CC. In this case, the LTE PUCCH format/rule can be used when the number of PDCCHs detected through a DL CC is less than a specific value (e.g. 2 or 3) and the CA PUCCH format can be used in other cases. For example, if the LTE PUCCH format/rule is used when the number of detected PDCCHs is less than 2, two PUCCHs may be simultaneously transmitted, channel selection may be performed using two PUCCH resources corresponding to CCE indices of each PDCCH or ACK/NACK bundling may be performed for transmission of ACK/NACK corresponding to two PDCCHs (PDSCHs).

Embodiment 2

A description will be given of resource collision that may occur when the LTE PUCCH format/rule and CA PUCCH format/rule are modified and used and solutions to resource collision.

Referring to FIG. 34c, when the BS transmits PDCCHs through the DL PCC and the DL SCC to UE A, the BS expects UE A to transmit ACK/NACK using the CA PUCCH format/resource. For example, the BS can expect UE A to transmit ACK/NACK using a PUCCH resource designated through higher layer signaling (e.g. RRC signaling). Accordingly, the BS can allocate UE A a PUCCH resource corresponding to the smallest CCE index of the DL SCC PDCCH transmitted to UE A. Specifically, the smallest CCE index of a PDCCH transmitted on the DL PCC to UE B may be identical to the smallest CCE index of the DL SCC PDCCH transmitted to UE A. However, since UE A has successfully detected the PDCCH through the DL SCC only, UE A transmits ACK/NACK using the PUCCH resource corresponding to the smallest CCE index of the detected PDCCH. However, the PUCCH resource used by UE A is identical to the PUCCH resource allocated to UE B and thus resource collision occurs. To prevent resource collision, scheduling restriction is needed, thus deteriorating scheduling flexibility. Schemes for preventing resource collision will now be described.

Embodiment 2-1

FIG. 35 illustrates a method for preventing resource collision during UCI transmission according to an embodiment of the present invention. The present embodiment describes a method of avoiding resource collision by signaling resource indication information through a PDCCH transmitted on a DL SCC.

Referring to FIG. 35, a UE detects a PDCCH from a DL CC in a carrier aggregation situation (S3510). The PDCCH includes a DL grant PDCCH and a UL grant PDCCH and is preferably the DL grant PDCCH. Three cases may be considered as a PDCCH detection scenario. Case 1 is detection of a PDCCH from a DL PCC only, case 2 is detection of a PDCCH from a DL SCC only and case 3 is detection of PDCCHs from a plurality of DL CCs. The UE may transmit UCI (e.g. ACK/NACK) according to the LTE PUCCH format/rule in case 1 (S3530) and transmit UCI (e.g. ACK/NACK) according to the CA PUCCH format/rule in case 3 (S3550).

In case 2, the UE checks whether a fallback transmission mode is set (S3520). Here, the fallback transmission mode refers to a mode in which the UE uses a legacy transmission scheme. In the present embodiment, the legacy transmission scheme includes transmission using the LTE PUCCH format/rule. The fallback transmission mode may be indicated through higher layer signaling (e.g. broadcast information, RRC signaling, MAC signaling, etc.). Otherwise, the fallback transmission mode may be indicated through physical layer signaling (e.g. PDCCH). Furthermore, in case 2, the fallback transmission mode may be set as a default transmission mode without additional signaling. In addition, the fallback transmission mode may be indicated according to whether the resource indication information, which will be described below, is present or not. For example, the fallback transmission mode can be automatically set when the resource indication information is present.

When the fallback transmission mode is not set, the UE can transmit UCI (e.g. ACK/NACK) according to the CA PUCCH format/rule (S3550). On the contrary, the UE transmits UCI (e.g. ACK/NACK) according to the LTE PUCCH format/rule when the fallback transmission mode is set (S3540). However, the PUCCH resource is determined using the resource indication information included in the PDCCH. The resource indication information includes information regarding identification/indication of a PUCCH resource. The resource indication information may include information for directly indicating a PUCCH resource index or information for changing the PUCCH resource index. For example, the resource indication information can indicate an offset value applied to the PUCCH resource index. The offset value may include an absolute value or a relative value indicating a predetermined relationship.

When the offset value is an absolute value, a PUCCH resource is configured as follows.

PDCCH A on a DL PCC for UE A: the smallest CCE index n0, PDCCH B on a DL SCC for UE B: the smallest CCE index n0, an offset value in PDCCH B=2→UE A uses a PUCCH resource n0+N_PUCCH$^{(1)}$ and UE B uses a PUCCH resource n0+2+N_PUCCH$^{(1)}$. PUCCH$^{(1)}$ is signaled by a higher layer.

When the offset value is an absolute value, a PUCCH resource may be configured as follows. It is assumed that offset values 1, 2 and 3 respectively correspond to absolute values 5, 10 and 15 for convenience.

PDCCH A on a DL PCC for UE A: the smallest CCE index n0, PDCCH B on a DL SCC for UE B: the smallest CCE index n0, an offset value in PDCCH B=2→UE A uses a PUCCH resource n0+N_PUCCH$^{(1)}$ and UE B uses a PUCCH resource n0+10+N_PUCCH$^{(1)}$. PUCCH$^{(1)}$ is signaled by a higher layer.

The resource indication information according to the present invention may be transmitted through a field (e.g. X bit field) newly defined in DCI or using all or some bits of a specific field from among existing DCI fields. A description will be given of a method for transmitting the resource indication information by reusing an existing DCI field. For example, a 3-bit TPC field in DL grant DCI is used for PUCCH power control in LTE. When carrier aggregation is applied, it is not necessary to use the TPC field of a DL SCC because a PUCCH is transmitted only on a UL PCC. Accordingly, the TPC field of the DL PCC can be used for PUCCH power control and the TPC field of the DL SCC can be used to transmit the resource indication information. Specifically, when the 3-bit TPC field is reused for offset value transmission, the degree of freedom for avoiding resource collision can be provided in the range of 0 to 7. Alternatively, an offset value may be transmitted using a 2-bit downlink assignment index (DAI) field used in TDD. In this case, resource collision can be avoided with the degree of freedom in the range of 0 to 3.

To increase the degree of freedom for preventing resource collision, an offset value in a DL PCC PDCCH may be transmitted along with an offset value in a DL SCC PDCCH. Otherwise, only the offset value in the DL PCC PDCCH may be transmitted.

When the resource indication information is transmitted using the TPC field of the DL SCC, a specific state or some bits of the TPC field may be used as an indicator indicating whether the LTE PUCCH format/rule is used or not. For example, if TPC bits are [b0, b1 b2], the most significant bit (MSB), b0, can be used as the indicator indicating whether the LTE PUCCH format/rule is used or not and [b1 b2] can be used as an offset value. Alternatively, [0 0 0], [0 0 1], . . . , [1 1 0] may be used as an offset value (7 states) and [1 1 1] may indicate that the LTE PUCCH format/rule is not employed. Accordingly, in the case of [1 1 1], it is possible to perform ACK/NACK feedback for a DL CC (or all available DL CCs or an activated DL CC) configured using the CA PUCCH format/rule.

Therefore, it is possible to efficiently use the LTE PUCCH format/rule without resource collision when a PDCCH is detected from a single DL CC irrespective of whether the DL CC is a PCC or an SCC.

Figure 36:
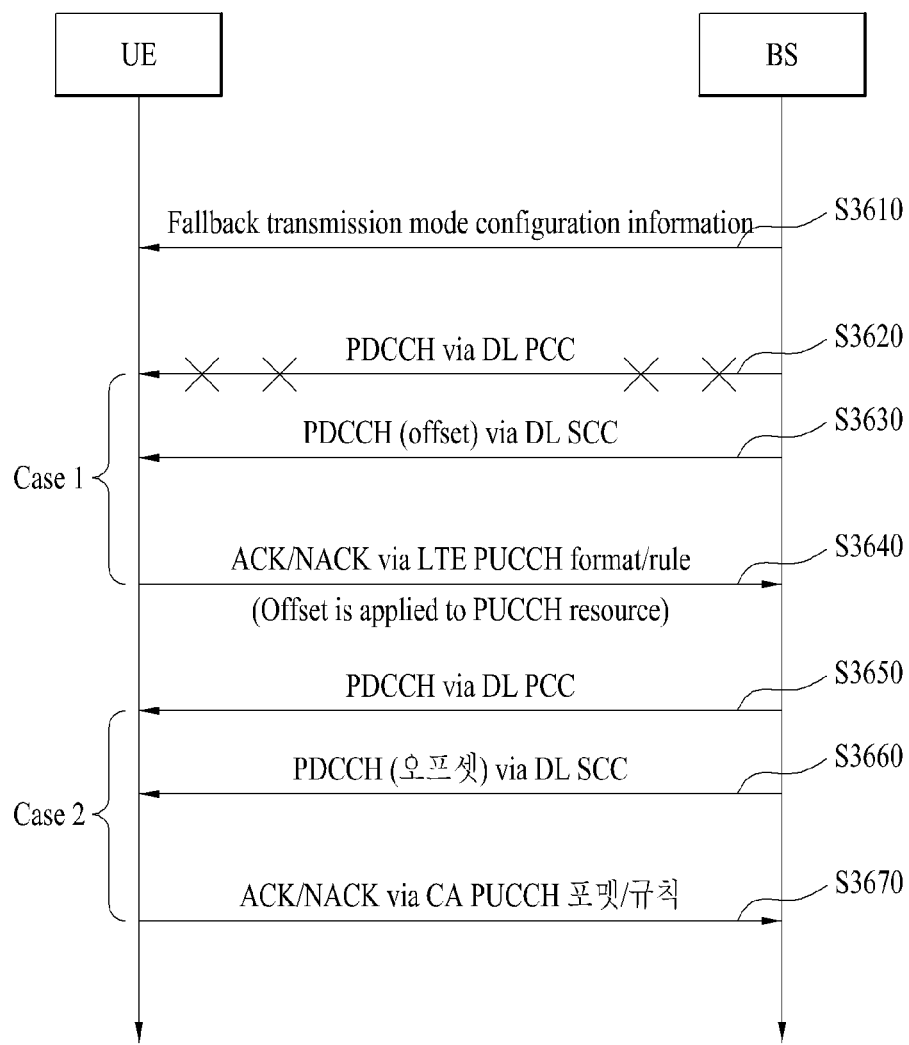

FIG. 36 illustrates an example of transmission of UCI according to the scheme of FIG. 35.

Referring to FIG. 36, a UE receives fallback transmission mode configuration information from a BS (S3610). The fallback transmission mode configuration information includes information indicating whether fallback transmission is used or not when the UE detects a PDCCH from a single DL SCC only. It is assumed that the fallback transmission mode is set for convenience and step S3610 may be omitted as necessary. Case 1 assumes a case in which the UE does not successfully detect a DL PCC PDCCH although the BS has transmitted the DL PCC PDCCH and a DL SCC PDCCH (S3620 and S3630). In this case, the UE transmits ACK/NACK using the LTE PUCCH format/rule because the UE has received the PDCCH from the DL SCC only. Here, a PUCCH resource is detected using offset information included in the DL SCC PDCCH. Case 2 assumes a case in which the BS transmits PDCCHs on the DL PCC and DL SCC (S3650 and S3660) and the UE detects the two PDCCHs. In this case, the UE transmits ACK/NACK using the CA PUCCH format/rule because the UE has received the PDCCHs from the plurality of DL CCs.

As another example of avoiding resource collision, a resource indication field may be interpreted differently according to CA scenario. As described above, the resource indication field can be transmitted using the TPC field, DAI field, etc. of the DL SCC PDCCH or separately defined in DCI. For example, when the resource indication field indicates a resource offset value, the UE can perform the following analysis and operations according to CA scenario.

When a PDCCH is detected from a single DL SCC only, the PDCCH is used as a resource offset for the LTE PUCCH format/rule.

When PDCCHs are detected from a plurality of DL CCs (DL PCC/SCC), the PDCCHs are used as a resource offset for the CA format/rule.

Embodiment 2-2

Figure 37:
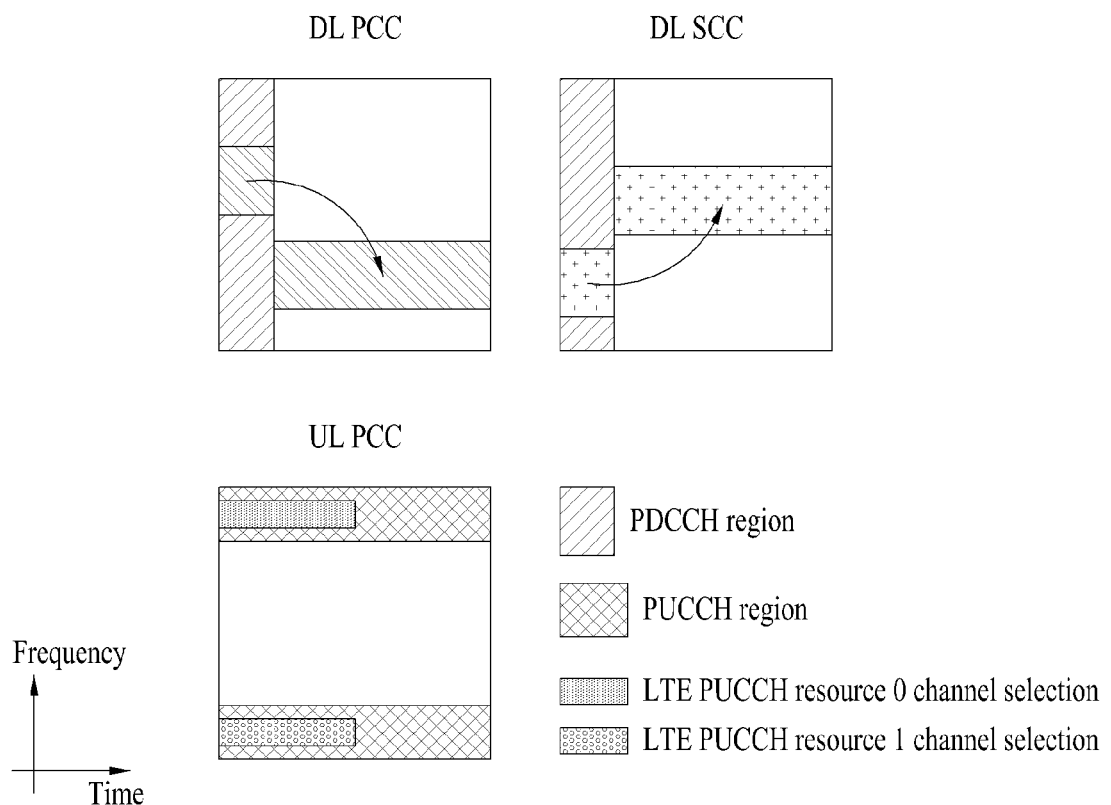
FIG. 37 illustrates UCI transmission according to an embodiment of the present invention.

FIG. 37 illustrates an example of transmitting control information using channel selection when PDCCHs are simultaneously scheduled through a plurality of DL CCs according to an embodiment of the present invention. According to the present embodiment, when the number of PDCCHs detected from DL CCs is P (e.g. P=2, 3 and 4) irrespective of whether each DL CC is a PCC or SCC, it is possible to infer P PUCCH resources from each DL CC to efficiently use channel selection (or other PUCCH formats (e.g. SF reduced PUCCH format)) without resource collision.

Referring to FIG. 37, the BS transmits PDCCH0 on a DL PCC and transmits PDCCH1 on a DL SCC (M=2). PDCCH0 is for PDSCH0 transmitted on the DL PCC and PDCCH1 is for PDSCH1 transmitted on the DL SCC. The UE successfully detects PDCCH0 and PDCCH1 (N=2) and receives PDSCHs indicated by PDSCH0 and PDSCH1. In this case, the UE can transmit ACKs/NACKs corresponding to the two PDSCHs through channel section using two PUCCH resources. The index of the first PUCCH resource for channel selection may be inferred from the smallest CCE index of the DL PCC PDCCH and the index of the second PUCCH resource for channel selection may be inferred from the smallest CCE index of the DL SCC PDCCH. Here, the resource indication field described in embodiment 2-1 may be defined in the DL SCC PDCCH. The resource indication field may include an offset value. In this case, it is possible to avoid collision of the first PUCCH resource and the second PUCCH resource.

Embodiment 2-3

Figure 38:
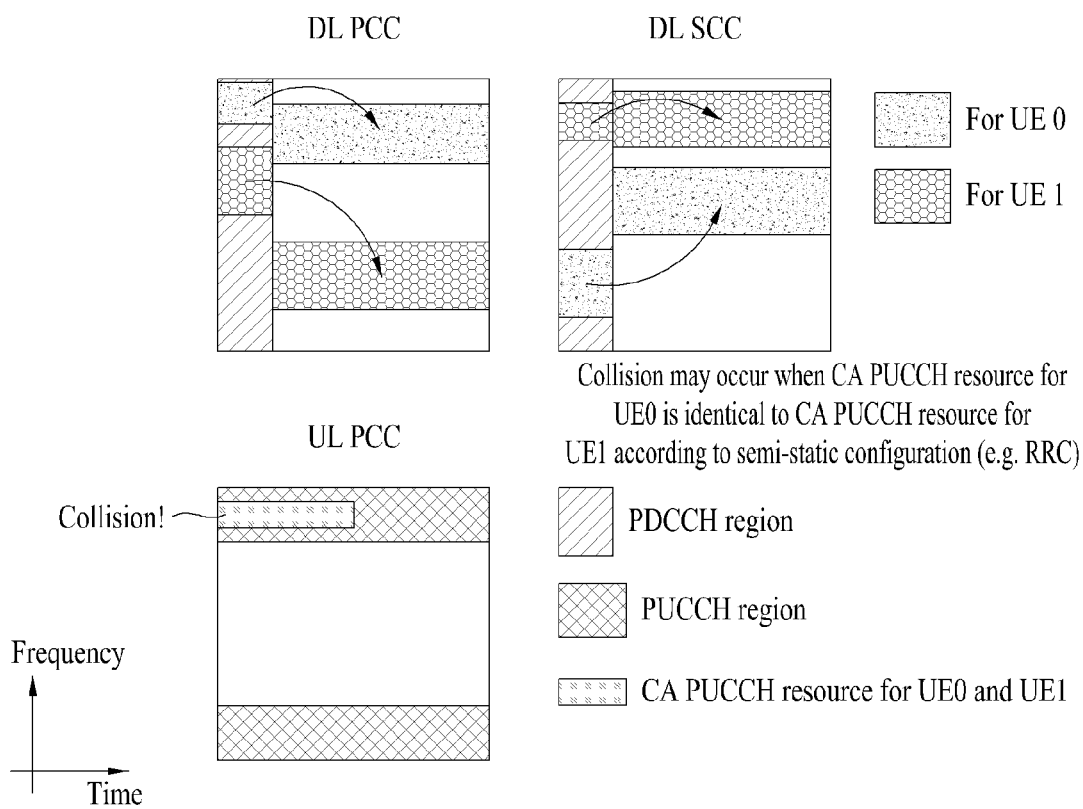
FIG. 38 illustrates a case in which resource collision occurs during UCI transmission.

FIG. 38 illustrates resource collision during UCI transmission. When control information is transmitted using the CA PUCCH format/rule, multiple UEs may share resources for the CA PUCCH format in order to increase resource efficiency. In this case, resource collision may occur between UEs that attempt to simultaneously transmit CA PUCCHs.

Referring to FIG. 38, UE A receives two PDCCHs and PDSCHs corresponding thereto through a DL PCC and a DL SCC. Similarly, UE B receives two PDCCHs and PDSCHs corresponding thereto through the DL PCC and DL SCC. UE A and UE B transmit ACKs/NACKs for the PDSCHs using the CA PUCCH format/rule because they have received the multiple PDSCHs through the multiple DL CCs. It is assumed that CA PUCCH resources for UE A and UE B are semi-statically configured through higher layer signaling (e.g. RRC signaling) for convenience. If the same CA PUCCH resource is configured for UE A and UE B, UE A and UE B attempt to transmit ACKs/NACKs using the same CA PUCCH resource, causing resource collision.

Figure 39:
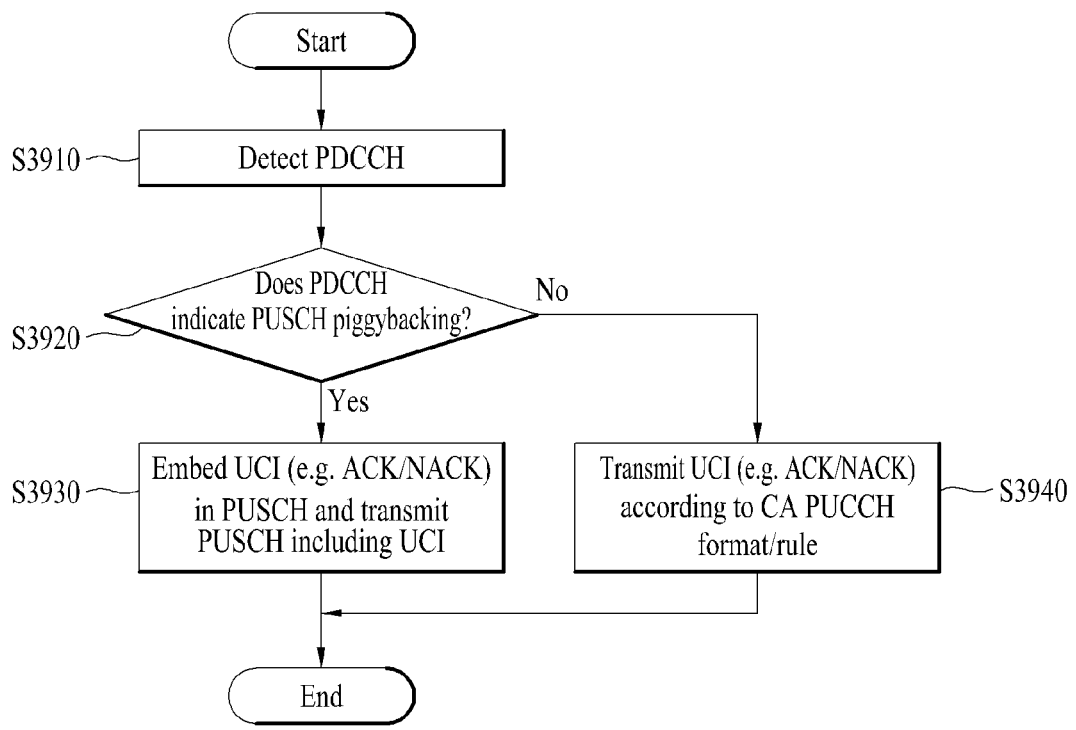
FIG. 39 illustrate a resource collision solution during UCI transmission according to an embodiment of the present invention.

FIG. 39 illustrates a method for preventing CA PUCCH resource collision during transmission of UCI according to an embodiment of the present invention.

Referring to FIG. 39, a UE detects a PDCCH from a DL CC in a carrier aggregation situation (S3910). The PDCCH includes a DL grant PDCCH and a UL grant PDCCH and is preferably the DL grant PDCCH. The UE checks whether the PDCCH indicates PUSCH piggybacking (S3920). The UE may embed UCI (e.g. ACK/NACK) in a PUSCH and transmit the PUSCH including the UCI when the PDCCH indicates PUSCH piggybacking, and transmit the UCI according to the CA PUCCH format/rule if not (S3940).

PUSCH piggybacking may be indicated using a PUSCH piggybacking indicator transmitted through a PDCCH on a DL PCC or a PDCCH on a DL SCC. For example, if the PUSCH piggybacking indicator corresponds to ON, ACK/NACK information may be embedded in a PUSCH and transmitted.

PUSCH piggybacking may conform to LTE rules or a UCI piggybacking rule defined for UL-MIMO. For example, ACK/NACK can be fed back to layers connected to a specific codeword or all codewords.

The PUSCH piggybacking indicator according to the present invention may be transmitted through a field (e.g. X bit field) newly defined in DCI or using all or some bits of a specific field from among existing DCI fields. For example, the PUSCH piggybacking indicator can be transmitted using a 3-bit TPC field or 2-bit DAI field of DCI. In case of the TPC field, the PUSCH piggybacking indicator may be transmitted using 1 bit of the TPC field. In this case, the remaining 2 bits of the TPC field may be used for other purposes.

If ACK/NACK is transmitted according to the LTE PUCCH format/rule when a PDCCH is scheduled through a DL PCC only, the PUSCH piggybacking indicator can be transmitted through a DL SCC PDCCH only. Otherwise, the PUSCH piggybacking indicator may be embedded in all or some scheduled PDCCHs. For example, the PUSCH piggybacking indicator can be transmitted through the first (last) PDCCH.

The PUSCH piggybacking indicator may be used along with the resource indication information (e.g. an offset value) for LTE PUCCH format/rule fallback described in embodiment 2-1. For example, when an offset value for resource collision avoidance is transmitted using the TPC field, at least MSB (or LSB) of the TPC field can be used as the PUSCH piggybacking indicator. For instance, if TPC bits are [b0, b1 b2], the MSB (e.g. b0) can be used as the PUSCH piggybacking indicator and [b1 b2] can be used as an offset value for avoiding resource collision. Specifically, when b0 indicates PUSCH piggybacking, the UE can transmit ACK/NACK through a PUSCH. If b0 does not indicate PUSCH piggybacking, the UE can transmit ACK/NACK using the LTE PUCCH format/rule and the corresponding PUCCH resource may be changed using [b1 b2]. Alternatively, one of TPC states may be used as the PUSCH piggybacking indicator. For example, [0 0 0], [0 0 1], . . . , [1 1 0] may be used as an offset value (7 states) for resource collision avoidance and [1 1 1] may be used as the PUSCH piggybacking indicator.

As another example of avoiding CA PUCCH resource collision, the resource indication field may be interpreted differently according to CA scenario. As described above, the resource indication field can be transmitted using the TPC field, DAI field, etc. of the DL SCC PDCCH or separately defined in DCI. For example, when the resource indication field indicates a resource offset value, the UE can perform the following analysis and operations according to CA scenario.

When a PDCCH is detected from a single DL SCC only, the PDCCH is used as a resource offset for the LTE PUCCH format/rule.

When PDCCHs are detected from a plurality of DL CCs (DL PCC/SCC), the PDCCHs are used as a resource offset for the CA format/rule.

Figure 40:
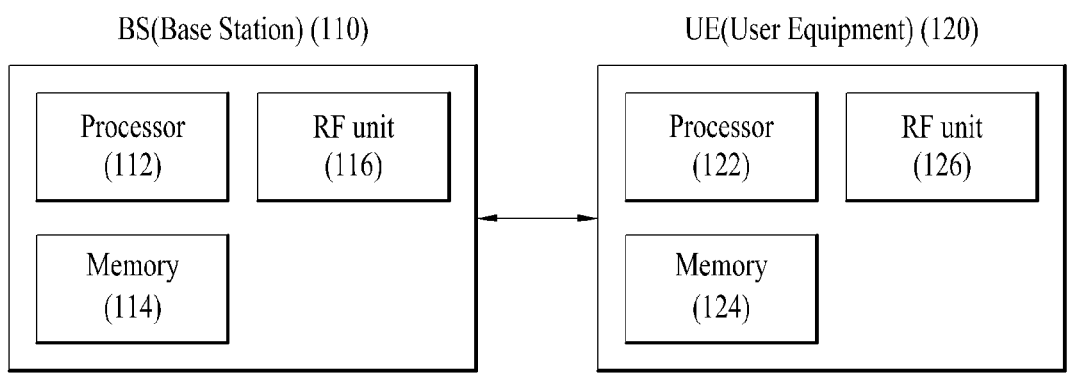
FIG. 40 illustrates a BS and a UE applicable to the present invention.

FIG. 40 illustrates a BS and a UE applicable to an embodiment of the present invention.

Referring to FIG. 40, an RF communication system may include a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 112 and transmits and/or receives RF signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be applied to a UE, a BS or other apparatuses of a mobile communication system. Specifically, the present invention is applicable to a method for transmitting UCI and an apparatus for the same.

The invention claimed is:

1. A method for transmitting an ACK or NACK (Acknowledgement or Negative ACK) by user equipment (UE) in a wireless communication system, the method comprising:
   receiving a PDCCH (Physical Downlink Control Channel);
   receiving a PDSCH (Physical Downlink Shared Channel) indicated by the PDCCH; and
   transmitting an ACK or NACK for the PDSCH on a PUCCH (Physical Uplink Control Channel) resource,
   wherein the PUCCH resource for the ACK or NACK transmission is determined by an index of Control Channel Elements (CCEs) and resource indication information when the resource indication information is included only in a PDCCH received through a Secondary Component Carrier (SCC),
   wherein an index of the PUCCH resource for the ACK or NACK transmission is inferred by the index of CCEs,
   wherein the resource indication information indicates an offset value applied to the index of the PUCCH resource for the ACK or NACK transmission.

2. The method according to claim 1, wherein the PDCCH is configured as an aggregation of one or more CCEs based on the index of the CCEs,
   wherein the index of the PUCCH resource for the ACK or NACK transmission is inferred based on the smallest value of index of the CCEs.

3. The method according to claim 1, wherein the resource indication information is received through a Transmit Power Control (TPC) field or a Downlink Assignment Index (DAI) field in the PDCCH.

4. The method according to claim 3, wherein the resource indication information is received through some bits or some states of the TPC field of the DAI field.

5. A user equipment (UE) configured to transmit an ACK or NACK (Acknowledgement or Negative ACK) in a wireless communication system, comprising:
   a radio frequency (RF) unit to transmits and receives RF signals;
   a memory stores information related to operations of the processor; and
   a processor is configured to control the RF unit and the memory,
   wherein the processor is further configured to:
   control the RF unit to receive a PDCCH (Physical Downlink Control Channel),
   control the RF unit to receive a PDSCH (Physical Downlink Shared Channel) indicated by the PDCCH, and
   control the RF unit to transmit an ACK or NACK for the PDSCH on a PUCCH (Physical Uplink Control Channel) resource,
   wherein the PUCCH resource for the ACK or NACK transmission is determined by an index of Control Channel Elements (CCEs) and resource indication information when the resource indication information is included only in a PDCCH received through a Secondary Component Carrier (SCC),
   wherein an index of the PUCCH resource for the ACK or NACK transmission is inferred by the index of CCEs,
   wherein the resource indication information indicates an offset value applied to the index of the PUCCH resource for the ACK or NACK transmission.

6. The UE according to claim 5, wherein the PDCCH is configured as an aggregation of one or more CCEs based on the index of the CCEs
   wherein the index of the PUCCH resource for the ACK or NACK transmission is inferred based on the smallest value of index of the CCEs.

7. The UE according to claim 5, wherein the resource indication information is received through a Transmit Power Control (TPC) field or a Downlink Assignment Index (DAI) field in the PDCCH.

8. The UE according to claim 7, wherein the offset value is received through some bits or some states of the TPC field of the DAI field.

* * * * *